(12) United States Patent
Kanitz

(10) Patent No.: US 11,648,855 B2
(45) Date of Patent: May 16, 2023

(54) SYSTEMS AND METHODS FOR SEAT RECONFIGURATION FOR AUTONOMOUS VEHICLES

(71) Applicant: UATC, LLC, San Francisco, CA (US)

(72) Inventor: Daniel Adam Kanitz, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 281 days.

(21) Appl. No.: 16/923,620

(22) Filed: Jul. 8, 2020

(65) Prior Publication Data
US 2021/0380022 A1 Dec. 9, 2021

Related U.S. Application Data

(60) Provisional application No. 63/034,426, filed on Jun. 4, 2020.

(51) Int. Cl.
*B60N 2/02* (2006.01)
*B60N 2/809* (2018.01)
*B60N 2/01* (2006.01)
*G06N 20/00* (2019.01)
*G06N 5/04* (2006.01)
(Continued)

(52) U.S. Cl.
CPC ............. *B60N 2/0248* (2013.01); *B60N 2/01* (2013.01); *B60N 2/809* (2018.02); *B60W 60/00253* (2020.02); *B60W 60/00256* (2020.02); *G05D 1/0212* (2013.01); *G06N 5/04* (2013.01); *G06N 20/00* (2019.01)

(58) Field of Classification Search
None
See application file for complete search history.

(56) References Cited

U.S. PATENT DOCUMENTS 7,484,795 B2 * 2/2009 Saint-Jalmes ............ A47C 7/48
297/130
11,358,494 B2 * 6/2022 Nawrocki .............. B60N 2/853
(Continued)

FOREIGN PATENT DOCUMENTS

WO WO-2005108150 A1 * 11/2005 ............... B60N 2/14
WO WO 2017/172415 10/2017

OTHER PUBLICATIONS

International Search Report and Written Opinion for Application No. PCT/US2021/035881, dated Sep. 17, 2021, 12 pages.

*Primary Examiner* — Abdhesh K Jha
(74) *Attorney, Agent, or Firm* — Dority & Manning, P.A.

(57) ABSTRACT

Systems and methods for reconfiguring seats of an autonomous vehicle is provided. The method includes obtaining service request data that includes a service selection and request characteristics. The method includes obtaining data describing an initial seat configuration for each of a plurality of seats of an autonomous vehicle assigned to the service request. The initial seat configuration can include a seat position and a seat orientation for each of the plurality of seats. The method includes generating, based on the initial cabin configuration and the service request data, seat adjustment instructions configured to adjust the initial seat configuration of at least one of the seats. The method includes providing the seat adjustment instructions to the autonomous vehicle assigned to the service request.

20 Claims, 10 Drawing Sheets

(51) Int. Cl.
 B60W 60/00 (2020.01)
 G05D 1/02 (2020.01)

(56) References Cited

U.S. PATENT DOCUMENTS

| | | | |
|---|---|---|---|
| 2015/0142245 A1* | 5/2015 | Cuddihy | B60N 2/01 |
| | | | 297/344.21 |
| 2017/0210322 A1 | 7/2017 | Rao et al. | |
| 2017/0285642 A1 | 10/2017 | Rander | |
| 2019/0106019 A1* | 4/2019 | Rose | B60N 2/002 |
| 2021/0064051 A1* | 3/2021 | Dudar | G05D 1/0225 |
| 2021/0107519 A1 | 4/2021 | Gassmann et al. | |

* cited by examiner

| SERVICE REQUEST DATA | |
|---|---|
| REQUESTOR(S) INDENTIFIER | X999999 |
| SERVICE SELECTION | XXXX |
| REQUEST CHARACTERISTICS | XXXX |

FIG. 3

| REQUEST CHARACTERISTICS DATA | |
|---|---|
| REQUESTOR(S) INDENTIFIER | X999999 |
| EXPECTED OCCUPANCY | XXXX |
| PASSENGER PREFERENCES | XXXX |
| USER-SPECIFIED REQUESTS | XXXX |
| HISTORICAL DATA | XXXX |
| START LOCATION | XXXX |
| END LOCATION | XXXX |
| ROUTE FEATURES | XXXX |
| TRIP DURATION | XXXX |

FIG. 4

| INITIAL SEAT 1 CONFIGURATION DATA | |
|---|---|
| SEAT POSITION | X999999 |
| SEAT ORIENTATION | XXXX |
| SEAT BASE ORIENTATION | XXXX |
| BACKREST ORIENTATION | XXXX |
| HEADREST ORIENTATION | XXXX |

FIG. 5

SYSTEMS AND METHODS FOR SEAT RECONFIGURATION FOR AUTONOMOUS VEHICLES

PRIORITY CLAIM

The present application is based on and claims benefit of U.S. Provisional Application 63/034,426 having a filing date of Jun. 4, 2020, which is incorporated by reference herein.

FIELD

The present disclosure relates generally to autonomous vehicles and, more particularly, seat reconfiguration for autonomous vehicles.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given such knowledge, an autonomous vehicle can navigate through the environment.

SUMMARY

Aspects and advantages of embodiments of the present disclosure will be set forth in part in the following description, or may be learned from the description, or may be learned through practice of the embodiments.

One example aspect of the present disclosure is directed to a computing system. The computing system can include one or more processors. The computing system can include one or more tangible, non-transitory, computer readable media that collectively store instructions that when executed by the one or more processors cause the computing system to perform operations. The operations can include obtaining service request data comprising a service selection from a plurality of services and one or more request characteristics. The operations can include obtaining data describing an initial seat configuration for each of a plurality of seats of an autonomous vehicle assigned to the service request, the initial seat configuration comprising a seat position and a seat orientation for each of the plurality of seats within a cabin of the autonomous vehicle, the seat orientation comprising an orientation of at least one of a backrest, a seat base, or a headrest of the seat. The operations can include generating, based on the initial cabin configuration and the service request data, seat adjustment instructions configured to adjust the initial seat configuration of at least one of the plurality of seats of the autonomous vehicle. The operations can include providing the seat adjustment instructions to the autonomous vehicle assigned to the service request.

Another aspect of the present disclosure is directed to a computer-implemented method. The method can include obtaining service request data comprising a service selection from a plurality of services and one or more request characteristics. The method can include obtaining data describing an initial seat configuration for each of a plurality of seats of an autonomous vehicle assigned to the service request, the initial seat configuration comprising a seat position and a seat orientation for each of the plurality of seats within a cabin of the autonomous vehicle, the seat orientation comprising an orientation of at least one of a backrest, a seat base, or a headrest of the seat. The method can include generating, based on the initial cabin configuration and the service request data, seat adjustment instructions configured to adjust the initial seat configuration of at least one of the plurality of seats of the autonomous vehicle. The method can include providing the seat adjustment instructions to the autonomous vehicle assigned to the service request.

Another aspect of the present disclosure is directed to one or more tangible, non-transitory, computer readable media that collectively store instructions that when executed by one or more processors cause the one or more processors to perform operations. The operations can include obtaining service request data comprising a service selection from a plurality of services and one or more request characteristics. The operations can include obtaining data describing an initial seat configuration for each of a plurality of seats of an autonomous vehicle assigned to the service request, the initial seat configuration comprising a seat position and a seat orientation for each of the plurality of seats within a cabin of the autonomous vehicle, the seat orientation comprising an orientation of at least one of a backrest, a seat base, or a headrest of the seat. The operations can include generating, based on the initial cabin configuration and the service request data, seat adjustment instructions configured to adjust the initial seat configuration of at least one of the plurality of seats of the autonomous vehicle. The operations can include providing the seat adjustment instructions to the autonomous vehicle assigned to the service request.

Other example aspects of the present disclosure are directed to other systems, methods, vehicles, apparatuses, tangible non-transitory computer-readable media, and the like for vehicle reconfiguration.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 3 depicts an example of service request data according to example implementations of the present disclosure;

FIG. 4 depicts an example of response characteristics data according to example implementations of the present disclosure;

FIG. 5 depicts an example of initial seat configuration data according to example implementations of the present disclosure;

DETAILED DESCRIPTION

Figure 1:
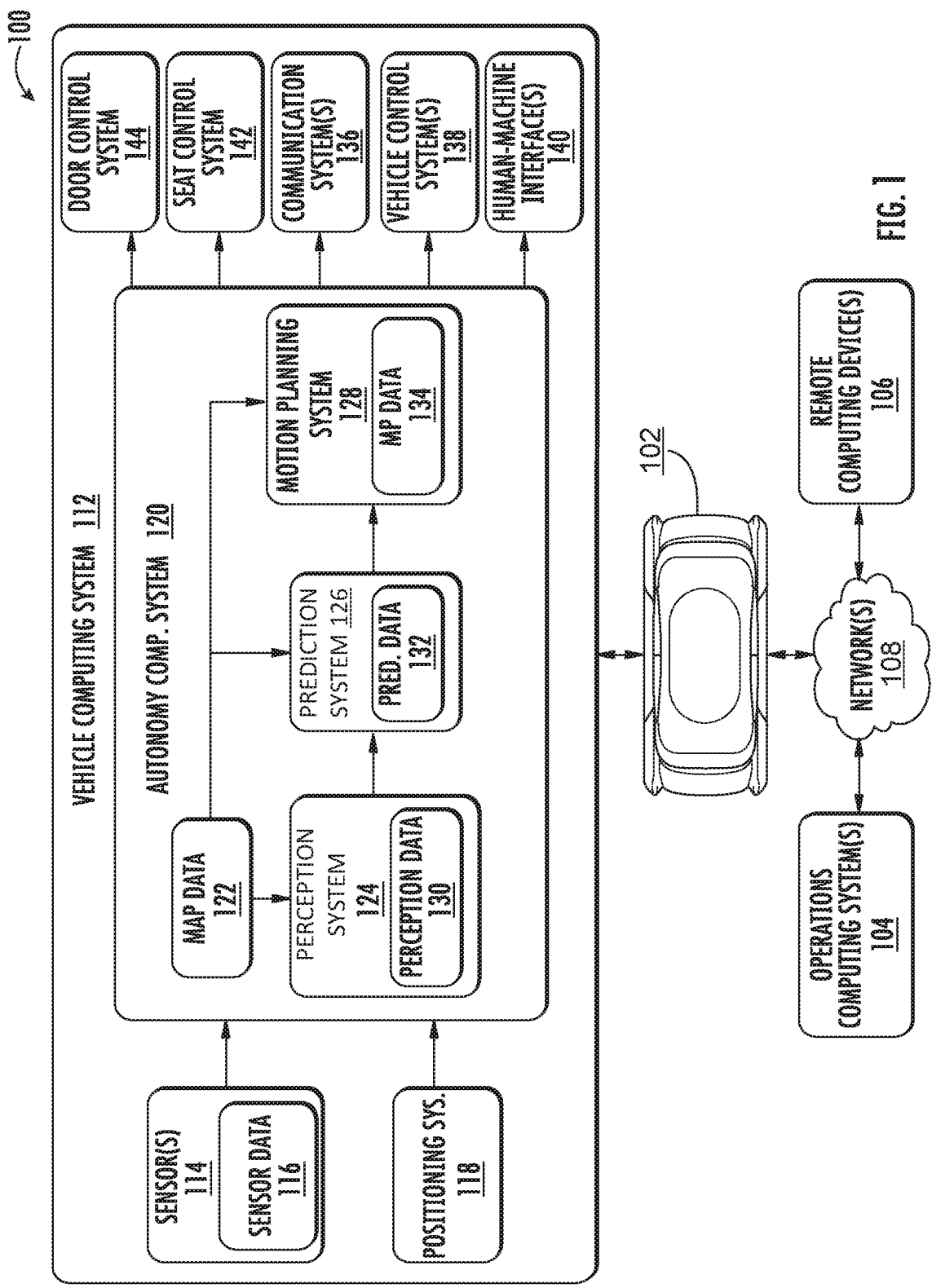
FIG. 1 depicts a block diagram of an example system according to example implementations of the present disclosure.

Example aspects of the present application are directed to improved systems and methods for dynamic seat reconfiguration for autonomous vehicles. More particularly, a transportation service provider can obtain transportation service request data, and in response, dynamically reconfigure a seating arrangement of the autonomous vehicle assigned to the service request before the autonomous vehicle arrives at the start location of the service. The reconfiguration of the seats can be based on the service request data, which can include request characteristic(s) (e.g., passenger preference data, trip duration, service route, etc.) and/or a service selection (e.g., represented by transportation service tiers, types of service (e.g., food delivery vs. passenger transport), etc.). By way of example, a computing system can obtain service request data that indicates the selection of a premium transportation service tier. In response to receiving the request data, the computing system can obtain data describing an initial seat configuration for each seat of the autonomous vehicle (e.g., seat positioning, a backrest orientation, a seat base orientation, etc.). Based on the initial configuration and the service selection, the computing system can generate seat adjustment instructions configured to adjust the initial seat configuration of one or more seats in the autonomous vehicle (e.g., to increase in-cabin leg room for a premium service, etc.). The seat adjustment instructions can be provided to the autonomous vehicle assigned to the service request by the computing system. In such fashion, the computing system can dynamically adjust the seating configuration of an autonomous vehicle to most optimally provide transportation services by reducing unnecessary time delays/vehicle downtime that may be caused by manual or post-pickup seat reconfiguration.

Aspects of the present application are directed to autonomous vehicles with dynamic seat reconfiguration to more efficiently provide a number of specialized services. More particularly, a computing system (e.g., an autonomous vehicle computing system, an operations computing system, etc.) can obtain a service request from a user for a vehicle service. The service request can include and/or be associated with service request data indicating a service provided by an autonomous vehicle. The autonomous vehicle can be an autonomous vehicle with the capacity to reconfigure its seats based on a number of factors (e.g., the service request data, etc.). The service request data can include a service selection. The service selection can indicate a particular service from a plurality of services offered by an autonomous vehicle and an associated service provider (e.g., food delivery, autonomous human passenger transportation, pooled transportation service, delivery services, courier services, etc.). As an example, the service request data can indicate an autonomous vehicle transportation service at a highest service tier of a number of service tiers (e.g., a more luxurious transportation service, etc.). As another example, the service request data may indicate a pooled transportation service (e.g., a transportation service pooled amongst a number of passengers submitting separate service requests).

It should be noted that the autonomous vehicle providing the service selected by the service selection can be an autonomous vehicle capable of a plurality of seat configurations. More particularly, the autonomous vehicle can include one or more seats that can individually or collectively be reconfigured (e.g., reconfiguration of a seat orientation and/or a seat position). As an example, a seat of the autonomous vehicle can change a location inside the autonomous vehicle (e.g., by sliding longitudinally along a track inside the cabin of the autonomous vehicle, etc.). As another example, a seat of the autonomous vehicle can change an orientation inside the autonomous vehicle (e.g., fully retracting a headrest in the seat, changing an angle of the seat back of the seat, folding the seat back onto the seat base of the seat to form a table, etc.). In such fashion, the seating arrangement of seats in the autonomous vehicle can be dynamically reconfigured to more efficiently provide a number of different services.

The service request data, associated with a user's service request, can include one or more request characteristics. The request characteristic(s) can describe aspect(s) of the requestor(s) and/or the selected service. In some implementations, the request characteristic(s) can describe an expected occupancy. As an example, the request characteristic(s) can indicate if a requestor of the service has indicated additional passengers for an autonomous transportation service (e.g., children, family members, friends, etc.). In some implementations, the expected occupancy can include occupancy predictions associated with the selected service. As an example, the computing system may determine (e.g., using machine-learned model(s), passenger data, etc.) that a service requestor generally travels with more than one person. As another example, the expected occupancy predictions may indicate a certain number of predicted occupants based on the service selection (e.g., a service selection for a certain tier of an autonomous transportation service, an pooled transportation service selection, etc.). The expected occupancy predictions can be generated using various methods by the computing system (e.g., machine-learning techniques, deterministic prediction algorithms, etc.).

In some implementations, the expected occupancy predictions can be based at least in part on previously collected autonomous vehicle sensor data associated with the requestor. As an example, previous service request(s) from the requestor can be associated with sensor data that indicated the presence of two additional passengers in the vehicle (e.g., collected from seat weight sensors, door sensors, etc.). In such fashion, the computing system can use previously collected sensor data to associate a usual number of additional passengers with a certain requestor.

In some implementations, the expected occupancy predictions can include a prediction of specific identity(s) of passenger(s) predicted to accompany the requestor. As an example, a requestor may historically request a certain tier of an autonomous vehicle transportation service when traveling with a spouse. Based on the service tier selection, the computing system can predict that the spouse of the requestor will accompany the spouse in the autonomous vehicle transportation service. Additionally, in some implementations, the passenger preferences for the spouse of the above example can be included in the expected occupancy predictions. For example, passenger preference data for the spouse may indicate that the spouse generally prefers a certain seat configuration for the autonomous vehicle transportation service.

In some implementations, the request characteristic(s) can include passenger preference data. Passenger preference data can indicate a requestor(s) preferred seat configuration for a vehicle. It should be noted that passenger preference data can refer to passengers of the autonomous vehicle. However, some services do not require a passenger (e.g., a food delivery service, etc.) and as such, passenger or requestor may be used interchangeably when discussing services of the autonomous vehicle. A "passenger" of the vehicle, as described, can refer to both the requestor of the service and any additional occupants of the vehicle. The preferred seat configuration can be based on an analysis of previous data associated with the requestor (e.g., user scores, user satisfaction determinations, previously selected user configurations, etc.). As an example, the passenger preference data may include user score(s) and/or user satisfaction data associated with services previously requested by the requestor. For example, if the requestor previously requested an autonomous transportation service at a certain tier, and the requestor left a poor review for the service after completion, the seat configuration of the autonomous vehicle while providing the service can be disincentivized for selection (by the computing system) for subsequent service requests by the requestor. Moreover, a computing system (e.g., its machine-learned models, etc.) can be receive user rating(s), review(s), etc. as a feedback process to learn which seat configurations were positively received by user(s) and which seat configurations were negatively received by user(s). The computing system can re-train/re-learn and adjust a certain seat configuration for a selected service in hopes of decreasing the amount of future negative feedback.

In some implementations, the passenger preference data can include user-entered data corresponding to the seat configuration of the autonomous vehicle. As an example, the user-entered data may specify a certain seat configuration preference for a number of the services of the autonomous vehicle. For example, the user-entered data may indicate that the user prefers a seat configuration that maximizes cabin space when requesting a highest service tier for an autonomous vehicle transportation service. As another example, the user-entered data may include a request to opt-out of certain seat configurations. For example, the user-entered data may include a request that the autonomous vehicle never use a passenger-facing seat configuration (e.g., vehicle seats facing one another, etc.) when requesting a highest service tier for an autonomous vehicle transportation service.

In some implementations, the passenger preference data can include preferences for two or more passengers of the autonomous vehicle transportation service. As an example, two requestors may request an autonomous vehicle pooled rideshare service. The passenger preference data can include specific passenger preference data for each of the two requestors. As another example, a single requestor can request an autonomous vehicle transportation service, and the service request can indicate the identity of two additional passengers. The passenger preference data can include specific passenger preference data for each of the two additional passengers.

In some implementations, the computing system can aggregate the passenger preference data for a number of passengers of the autonomous vehicle. More particularly, the passenger preference data can be aggregated such that the aggregated passenger preference data indicates a seat configuration preference that satisfies the most passengers. As an example, four passengers can be utilizing an autonomous vehicle pooled rideshare service. Passenger preference data for three of the passengers can indicate that the passengers prefer a seat configuration where passengers do not face each other. Passenger preference data for one passenger can indicate the passenger prefers a seat configuration where passengers do face each other. The passenger preference data for all four passengers can be aggregated such that the aggregated passenger preference data indicates that the passengers prefer a seat configuration where passengers do not face each other.

In some implementations, the passenger preference data can indicate accessibility configurations required by a passenger. As an example, passenger preference data for a passenger who uses a wheelchair can indicate that the passenger requires a seat configuration accessible to wheelchair-using occupants (e.g., an open seat configuration to facilitate wheelchair access, an extendable wheelchair ramp, etc.). In such fashion, the passenger preference data can be utilized to quickly and efficiently provide accessibility services to passengers who would previously be forced to wait for significant periods of time before a specially configured vehicle was available for them.

In some implementations, the passenger preference data can indicate passenger historical data. The historical data can describe previous passenger preferences and/or behaviors that indicate a preference. As described previously, the historical data can be utilized by the computing system to predict an expected occupancy. As an example, the historical data can indicate that the passenger generally travels with two additional occupants when requesting an autonomous vehicle transportation service. In some implementations, the historical data can indicate previous behavior that indicates preferred configurations. As an example, the historical data may indicate that a passenger generally brings luggage when requesting an autonomous vehicle transportation service to an airport, and therefore prefers a seat configuration that maximizes luggage capacity in the autonomous vehicle when traveling to an airport. The historical data for the passenger can store and utilize any previous preferences and/or behaviors that relate to the selection of an autonomous vehicle seat configuration.

In some implementations, the historical data can indicate a passenger experience level with the autonomous vehicle transportation service. More particularly, the historical data can indicate a number of times the requestor and any associated passengers have utilized various service(s) of the autonomous vehicle service provider. As an example, the historical passenger data can indicate that a requestor has never previously utilized an autonomous vehicle transportation service. In response, the seat configuration can, in some implementations, be adjusted (e.g., via seat adjustment instructions) to increase the comfort of the requestor. As another example, the historical data can indicate that a passenger associated with the requestor has never previously utilized an autonomous vehicle transportation service. In response, the seat configuration can, in some implementations, be adjusted (e.g., via seat adjustment instructions) to increase the comfort of the passenger.

It should be noted that, in some implementations, the passenger preference data associated with a passenger can be analyzed as it is collected, utilized to generate and/or modify seat configuration preferences, and then discarded. More particularly, the passenger preference data may only contain a passenger's predicted seat configuration preferences, without containing any personalized information (e.g., passenger locations, passenger behavior, etc.). As such, the passenger preference data can be utilized to optimally predict the best seat configuration for a passenger without containing any personalized data associated with the passenger.

Additionally, or alternatively, in some implementations, passengers and requestors of services may opt-out of any passenger preference data collection, and/or can opt-out of the collection of specific passenger preference data. In some implementations, passengers or requestors of the autonomous vehicle may be required to "opt-in" to passenger preference data collection.

In some implementations, the request characteristic(s) can include an associated trip service route. The associated trip service route can include a start location and an end location for the associated trip service route. As an example, a requestor can request an autonomous vehicle transportation service from the requestor's location to a restaurant. The start location of the associated trip service route can be the requestor's location and the end location for the associated trip service route can be the restaurant.

In some implementations, the associated trip service route can include route features for the planned route to be navigated from the start location to the end location. In some implementations, the planned route can be generated by the computing system. Alternatively, in some implementations, the planned route can be generated by an associated computing system that is communicatively coupled to the computing system (e.g., a route planning computing system, operations computing system, etc.). The route features can be one or more features of the planned route. The route features can include a highest speed, a type of steering required for the route, a route environment, a route duration, or any other type of information relevant to the route traveled by the autonomous vehicle from the start location to the end location.

As an example, the route features can indicate that the route environment is generally considered a scenic route (e.g., based on aggregated passenger preference data, weather data, etc.) that is easily viewed from certain windows of the autonomous vehicle (e.g., viewing the ocean from the left side of the autonomous vehicle, etc.). As another example, the route features may indicate that the route requires a number of sharp cornering maneuvers generally unsuitable for certain seat configurations. As yet another example, the route features may indicate that the planned route requires high-speed highway travel that is generally considered unsuitable for certain seat configurations.

In some implementations, the route features can be aggregated over time alongside passenger data to better predict the effect of route features (e.g., using machine-learning techniques, etc.). As an example, the computing system can generally associate passenger data indicating passenger sickness with certain seat configurations and high speed cornering. As another example, the computing system can generally associate passenger data indicating discomfort with certain seat configurations and highway travel. In such fashion, the computing system can predict an optimal seat configuration based on the route features of the planned route.

In response to receiving the service request data, the computing system can obtain data describing an initial seat configuration for each of a plurality of seats of an autonomous vehicle assigned to the service request. In some implementations, the assigned autonomous vehicle can be assigned to provide the service by the computing system. Alternatively, in some implementations, an associated computing system can assign the autonomous vehicle to provide the service (e.g., an operations computing system, etc.). In some implementations, the data describing the initial seat configuration can be obtained directly from the autonomous vehicle (e.g., via a network, etc.). Alternatively, in some implementations, the data describing the initial seat configuration can be obtained from a computing system associated with the autonomous vehicle (e.g., a third-party computing system, a routing computing system, etc.). Alternatively, in some implementations, if the computing system is an autonomous vehicle computing system (e.g., a computing system located onboard the autonomous vehicle, etc.) the data describing the initial seat configuration can be obtained from the sensors and/or a computing device of the autonomous vehicle.

The initial seat configuration for each seat of the autonomous vehicle can include a seat position for the seat within the cabin of the autonomous vehicle. The seat position for the seat within the cabin can be a longitudinal and/or lateral position inside the cabin. As an example, if viewing the exterior doors of the vehicle, the seat can be located longitudinally along the side of the vehicle. More particularly, the seat position can correspond to a position on a track (e.g., a seat track located in the floor of the autonomous vehicle, etc.) that spans the interior of the autonomous vehicle. The seat position can be reconfigured by moving the seat along the seat track inside the autonomous vehicle. In such fashion, the seat position of the initial seat configuration can describe a longitudinal position on the track located in the floor of the autonomous vehicle.

It should be noted that, in some implementations, not all seats of the autonomous vehicle are necessarily connected to the track inside the floor of the autonomous vehicle. Instead, the seat position can describe a folded position of a seat in the autonomous vehicle that is not connected to a track inside the autonomous vehicle. More particularly, a first seat of the autonomous vehicle can be configured to fold forward to attach to the back of a second seat of the autonomous vehicle. Further, the first seat can be configured to unfold from the back of the seat to a default seat position. In such fashion, one seat can fold and unfold from the back of another seat inside the autonomous vehicle.

The initial seat configuration for each seat of the autonomous vehicle can include a seat orientation for each of the seats in the autonomous vehicle. The seat orientation can include a backrest, a seat base, and/or a headrest orientation. The seat backrest can be the back-support component of the seat. The seat backrest orientation can be configured to move about an angle where the seat backrest attaches to a seat base of the seat. As an example, the seat backrest can fold to be parallel to the seat base of the seat. As another example, the seat backrest can be positioned to be perpendicular to the seat base of the seat. The seat base, similar to the seat back, can move about an angle of the seat to adjust a sitting angle. Additionally, the seat base can move longitudinally about an axis.

In some implementations, the seat base can be moved concurrently with the seat backrest to switch a facing direction of the seat. As an example, the seat can be facing a first direction (e.g., a passenger sitting in the seat would be looking in the first direction). The seat backrest can move in conjunction with the seat base such that the seat can subsequently face a second direction opposite that of the first direction (e.g., facing away from one another).

The seat orientation can describe an orientation of the headrest of a seat. The orientation of the headrest can correspond to a lateral position of the headrest of the seat. More particularly, the headrest orientation can refer to a degree of retraction of the headrest into the backrest of the seat. As an example, the headrest can be oriented to fully retract inside the backrest of the seat (e.g., to facilitate configuration of the seat into a table configuration, etc.). As another example, the headrest orientation can be configured to fully extend outside the backrest of the seat.

In some implementations, the initial seat configuration for each seat of the autonomous vehicle can include a seat direction for each of the seats in the autonomous vehicle. The seat direction for a seat can describe a direction the seat is facing relative to other aspects of the autonomous vehicle. More particularly, the seat direction can be defined as the direction that a passenger of the seat would face. As an example, a front facing seat direction can describe a seat direction in which a passenger sitting in the seat would face longitudinally towards the front section of the autonomous vehicle. As another example, a rear facing seat direction can describe a seat direction in which a passenger sitting in the seat would face longitudinally towards the rear section of vehicle. As yet another example, a side facing seat direction can describe a seat direction in which a passenger sitting in the seat would face laterally towards a side section of the vehicle (e.g., to facilitate viewing of natural scenery through vehicle windows, etc.). In such fashion, the seat direction of the initial seat configuration can describe any seat direction of a seat relative to aspects of the autonomous vehicle.

In response to receiving the service request data, the computing system can generate seat adjustment instructions. The seat adjustment instructions can be based on the initial cabin configuration and the service request data. The seat adjustment instructions can be configured to adjust an initial seat configuration of at least one seat of the plurality of seats inside the cabin of the autonomous vehicle. In some implementations, the seat adjustment instructions can be configured to adjust the initial seat configuration to maximize an amount of cabin space (e.g., based on the service request, etc.). The instructions can do so by adjusting the initial seat configuration so that the seats are positioned on the longitudinal edges of the cabin of the autonomous vehicle. For example, the instructions can be configured to adjust a seat back orientation, a headrest orientation, a seat bottom orientation, and/or a seat position of a seat of the autonomous vehicle.

In some implementations, the seat adjustment instructions can be configured to adjust the seat configurations such that the seats do not face one another (e.g., based on passenger preferences indicating passengers prefer to avoid eye contact, etc.). As an example, the seats can be initially configured to face one another. The seat adjustment instructions can be configured to adjust the seat configuration so that the seat backrest and seat base move in such a way that the seats face away from one another. Additionally, the seat adjustment instructions can move the position of the seats so that the backs of opposing seats are adjacent to each other in the middle of the autonomous vehicle cabin. In such fashion, the seat adjustment instructions can change an initial passenger-facing seat configuration to a more "bench-like" seat configuration where the backs of the seats are positioned are against each other.

Alternatively, in some implementations, the seat adjustment instructions can be configured to adjust the seat configurations such that the seats do face one another (e.g., based on passenger preference data indicating that two passengers know each other, etc.). As an example, the fare data (e.g., the fare data received in the service request) can indicate that two passengers (e.g., picked-up or dropped-off at the same location) are splitting a fare for an autonomous vehicle transportation service. In response, the seat adjustment instructions can be configured to adjust the seat configuration so that the seat backrest and the seat base move in such a way that the seats face each other (e.g., to facilitate eye contact, conversation, etc.). In such fashion, the seat adjustment instructions can change an initial same-facing "bench-like" seat configuration to a "passenger-facing" seat configuration to facilitate communication and comfort between friends and family.

In some implementations, the seat adjustment instructions can be configured to adjust the seat configurations such that one or more seats in a row are staggered such that the one seat is positioned slightly further in a longitudinal direction than the one or more other seats. As an example, three seats can initially be configured to be positioned in a row, where each seat is positioned in the exact same longitudinal position (e.g., each seat is on an individual track where the longitudinal position of each seat on each track is the same). The seat adjustment instructions can be configured to adjust the longitudinal position of the middle of the three seats so that the middle seat is positioned further longitudinally in the direction the seats are facing than the two side seats (e.g., based on expected occupancy data indicating a certain number of passengers, etc.). As another example, two seats can initially be configured to be positioned in a row, where each seat is positioned in the exact same longitudinal position. The seat adjustment instructions can be configured to adjust the longitudinal position of one of the two seats so that the seat is positioned further longitudinally in the direction the seats are facing than the other seat. In such fashion, one or more seats can be positioned slightly forward in a seat-facing direction than the other seat(s) in the row, therefore reducing the chance that passengers sitting in the seats in the row will rub shoulders.

In some implementations, the seat adjustment instructions can be configured to adjust the seat configurations such that one or more of the seats are folded into a table configuration (e.g., based on passenger preference data indicating that a passenger is likely to work and/or to eat during the service, etc.). As an example, the seats can be initially configured to face one another. The seat adjustment instructions can be configured to adjust the seat configuration so that the seat backrest of one seat folds to a position parallel to the seat base (e.g. both the seat base and the seat backrest parallel to the floor of the autonomous vehicle, etc.). Additionally, the seat adjustment instructions can move the position of the folded seat so that the seat is directly in front of a passenger and a relatively short distance from the passenger. In such fashion, the seat adjustment instructions can change an initial passenger-facing seat configuration "table" configuration such that the passenger can use the backrest of the seat as a table for eating or working during the autonomous transportation service. Such a seat configuration can be associated with a "business" or "work" type of service selection such that a passenger may utilize the table as a working surface.

In some implementations, the seat adjustment instructions be based at least in part on a destination location. The seat adjustment instructions can be configured to adjust the seat configurations to a cargo capacity configuration such that seats of the autonomous vehicle are folded and/or moved to maximize the cargo capacity of the autonomous vehicle (e.g., based on a food delivery service selection, an airport destination, etc.). For example, the destination of the vehicle can be an airport location (e.g., based on the request characteristics, etc.). Based on the airport destination, the seat adjustment instructions can move the seat position and the seat orientation of one or more seats in the cabin to maximize a cargo capacity of the autonomous vehicle (e.g., folding one or more seats, etc.). It should be noted that in some implementations, the cargo capacity configuration can have an occupied mode and a non-occupied mode. The occupied mode can configure the seats to maximize a cargo space in the vehicle while still allowing passengers to occupy the vehicle (e.g., maintaining some seats in an unfolded position, etc.), while the non-occupied mode can configure the seats to maximize the cargo space in the vehicle without regard to the occupancy of the vehicle (e.g., folding all seats in the vehicle, etc.).

As described previously, the seat adjustment instructions can be based at least in part on the service request data. As an example, the seat adjustment instructions can be based on the service selection. For example, the seat configuration can be adjusted to maximize cargo space based on a food delivery service selection. For another example, the seat configuration can be adjusted to maximize the passenger capacity of the vehicle based on an autonomous vehicle rideshare pooling service selection. Further, the seat adjustment instructions can be based on the request characteristic(s). As an example, the seat configuration can be adjusted to maximize passenger capacity based on an expected occupancy prediction. As another example, the seat configuration can be adjusted to maximize the comfort of one passenger based on passenger preference data. As yet another example, the seat configuration can be adjusted to a seat configuration that provides accessibility features based on accessibility data (e.g., the capability to fit a wheelchair, etc.).

In some implementations, generating the seat adjustment instructions can include detecting, by the computing system using one or more sensors in the cabin of the autonomous vehicle, one or more objects inside the cabin of the autonomous vehicle. More particularly, the computing system can utilize sensor(s) in the cabin of the autonomous vehicle (e.g., camera(s), weight sensor(s), etc.) to detect objects inside the autonomous vehicle (e.g., forgotten briefcases, toys, smartphones, etc.). Based on the detected objects, the computing system can generate and/or modify the seat adjustment instructions. As an example, the computing system can determine, based on the initial seat configuration and the service request data, to fold three seats in a row to a folded position. The computing system can detect a briefcase left by a passenger in the middle seat. In response, the computing system can generate seat adjustment instructions that fold the outer two seats in the row into a folded position while keeping the middle seat (e.g., the seat with the briefcase) in an upright position to avoid damaging the briefcase and/or the seat.

Alternatively, in some implementations, the example described above could instead lead the autonomous vehicle to take a separate action. As an example, the autonomous vehicle may forego generating any seat adjustment instructions. Instead, the autonomous vehicle may provide a notification to the passenger associated with the item (e.g., including it should be removed, has been left, etc.). As another example, the autonomous vehicle may return to a maintenance location so that the object can be removed. It should be noted that the autonomous vehicle can take any sort of action in response to detecting the presence of an object in the interior of the cabin of the autonomous vehicle.

In some implementations, the computing system can utilize sensor data to determine the efficiency of various seat configuration(s) (e.g., using machine-learning techniques, etc.). More particularly, the computing system can analyze various performance characteristics (e.g., passenger ingress and/or egress, luggage loading and/or unloading, etc.) based on the sensor data to determine seat configuration efficiency for facilitating passenger utilization of the autonomous vehicle. As an example, sensor data (e.g., weight sensor, image data, motion detector data, etc.) can be analyzed to determine that passenger ingress takes more time than average when utilizing a certain seat configuration. Based on the amount of time, the computing system can determine and/or assign a seat configuration efficiency value to the seat configuration. The computing system can evaluate the seat efficiency value when generating seat adjustment instructions.

Additionally, in some implementations, the computing system can associate seat configuration efficiency with request characteristics data. More particularly, a seat efficiency value can be correlated to certain request characteristics (e.g., a number of passengers, an amount of luggage, a trip duration, a number of stops, etc.) In such fashion, a first seat configuration could be associated with a plurality of seat efficiency values, each seat efficiency value correlated to different circumstances indicated by request characteristic data. As an example, the computing system can assign a first seat efficiency value to a first seat configuration when three passengers are traveling in the vehicle. The computing system can then assign a second seat efficiency value to the first seat configuration when one passenger is traveling in the vehicle. When evaluating seat configuration efficiency to generate seat adjustment instructions, the computing system can utilize the seat efficiency value that corresponds to the current circumstances indicated by the request characteristic(s). In such fashion, the computing system can utilize such information as a feedback learning process to determine the most efficient seat configuration for the circumstances indicated by the request characteristics (e.g., a number of passengers, a certain destination, a trip duration, etc.). For example, machine-learned models utilized to determine/recommend seat configurations can be re-trained on such data to refine future determinations/recommendations.

In response to receiving the service request data, the computing system can provide the seat adjustment instructions to the autonomous vehicle. In some implementations, the computing system can be separate from the autonomous vehicle and can provide the seat adjustment instructions to the vehicle (e.g., via networks, associated first and/or third-party computing systems, etc.). Alternatively, in some implementations, the computing system can be included in or otherwise be an autonomous vehicle computing system of the autonomous vehicle (e.g., physically located onboard the autonomous vehicle, etc.), and can therefore directly adjust the seats of the autonomous vehicle based on the seat adjustment instructions.

It should be noted that, in some implementations, the autonomous vehicle can be configured to adjust the seats of the autonomous vehicle based on the seat adjustment instructions before passenger(s) enter the vehicle. More particularly, the autonomous vehicle can begin and complete seat reconfiguration (e.g., based on the adjustment instructions) before allowing occupants to enter the vehicle. In such fashion, the autonomous vehicle can prevent any accidental injury to passengers accessing the autonomous vehicle.

In addition, or alternatively, the operations computing system can provide for fleet-wide reconfigurations by providing seat adjustment instructions to a plurality of autonomous vehicles. For instance, the computing system (e.g., an operations computing system of an autonomous vehicle service provider, etc.) can determine that a plurality of vehicles can be reconfigured based on one or more external factors (e.g., demand curve matching, load balancing, high capacity incentivization in peak demand times/locations, emergency evacuation situation (e.g., due to weather, etc.), etc.). It should be noted that these one or more external factors can, in some implementations, be determined based at least in part on analysis of a plurality of collected service requests and/or data from external sources (e.g., machine-learned analysis of recent news stories or other real-time data sources, etc.).

As an example, the computing system (e.g., the operations computing system of an autonomous vehicle service, etc.) can determine, based on a number of collected service requests, that a demand curve spike is occurring. Based on the detection of the demand curve spike, a number of autonomous vehicles (e.g., a regional/localized fleet of autonomous vehicles, etc.) can be supplied with seat adjustment instructions that maximize a passenger occupancy of the vehicle. As another example, the computing system can determine, based at least in part on a number of collected service requests and a machine-learned analysis of recent information sources, that an emergency situation is occurring in a geographic area (e.g., a natural disaster, car accident, etc.). Based on the detection of the emergency situation, autonomous vehicles in the geographic area can be supplied with seat adjustment instructions to facilitate transport of affected people (e.g., a maximized passenger capacity, a configuration to facilitate transportation of injured persons, etc.). It should be noted that in the detection of an emergency situation, the computing system can also temporarily reduce or eliminate the costs associated with all services provided by the reconfigured autonomous vehicles. In such fashion, the computing system can quickly and efficiently facilitate safe travel for a maximum number of users of the autonomous vehicle service that are affected by an emergency situation.

As another example, the computing system can determine that a number of autonomous vehicles located in a certain geographic area (e.g., a high-density urban area, a low-density rural area, etc.) should each reconfigure seating configurations using the same seat adjustment instructions. For example, the computing system can determine from a number of service requests that the vast majority of service requests in a high-density urban area prefer a seat configuration that maximizes a number of passengers of the autonomous vehicle (e.g., to lower an associated ride cost, etc.). In response, the computing system can provide seat adjustment instructions to every or most autonomous vehicles in the high-density urban area to reconfigure the autonomous vehicles to a seating configuration that maximizes a number of passengers of the autonomous vehicle. In such fashion, the computing system can determine an optimal default configuration for an entire fleet of autonomous vehicles and/or a subset of a fleet of autonomous vehicles, and can reconfigure a desired number of vehicles concurrently (e.g., based on market demand, collated service request data, etc.).

Various means can be configured to perform the methods and processes described herein. For example, a computing system can include service request receiving unit(s), seat configuration obtaining unit(s), seat adjustment instruction generation unit(s), seat adjustment instruction providing unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain data (e.g., service request data) from service requestor that indicates a service selection and one or more request characteristics for the service request. A service request obtaining unit is an example of means obtaining such data from an autonomous vehicle at an operations computing system as described herein.

The means can be configured to obtain an initial seat configuration for each seat in an autonomous vehicle. For example, the means can be configured to obtain initial seat configuration data that describes a seat position and a seat orientation for each seat in an autonomous vehicle assigned to a service request. A seat configuration obtaining unit is one example of a means for obtaining an initial seat configuration for one or more seats of an autonomous vehicle as described herein.

The means can be configured to generate seat adjustment instructions. For example, the means can be configured to generate, based on the initial seat configuration and the service request data, generate seat adjustment instructions configured to adjust the seat position and/or the seat orientation of at least one seat. A seat adjustment instruction generation unit is one example of a means for generating seat adjustment instructions configured to reconfigure one or more seats of an autonomous vehicle as described herein.

The means can be configured to provide seat adjustment instructions. For example, the means can be configured to provide the generated seat adjustment instructions to an autonomous vehicle (e.g., via a network, one or associated computing systems, etc.). A seat adjustment instruction providing unit is one example of a means for allocating excess computational resources as described herein.

The present disclosure provides a number of technical effects and benefits. As one example technical effect and benefit, the systems and methods of the present disclosure enable a single vehicle to provide a variety of autonomous vehicle services. More particularly, the present disclosure can reconfigure the seating arrangements of autonomous vehicles in real-time to facilitate a variety of different services. By allowing a single vehicle to provide a variety of different autonomous vehicle services, the present disclosure can drastically reduce the number of vehicles utilized by autonomous vehicle service providers, which can, in turn, reduce traffic congestion and environmental damage. Further, by dynamically reconfiguring the seating of an autonomous vehicle, an autonomous vehicle service provider can utilize any vehicle to perform any service, allowing the autonomous vehicle service provider to quickly provide any service to a service requestor instead of waiting for a specialized vehicle configured to provide the service.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art. With reference to the figures, example embodiments of the present disclosure will be discussed in further detail.

FIG. 1 depicts a block diagram of an example system 100 for controlling the navigation of a vehicle according to example embodiments of the present disclosure. As illustrated, FIG. 1 shows an example system 100 that can include an autonomous vehicle 102, an operations computing system 104, one or more remote computing devices 106, a communication network 108, a vehicle computing system 112, one or more sensors 114, sensor data 116, a positioning system 118, an autonomy computing system 120, map data 122, a perception system 124, a prediction system 126, a motion planning system 128, state data 130, prediction data 132, motion plan data 134, a communication system 136, a vehicle control system 138, a human-machine interface 140, a seat control system 142, and a door control system 144.

The operations computing system 104 can be associated with a service provider (e.g., service entity) that can provide one or more vehicle services to a plurality of users via a fleet of vehicles (e.g., service entity vehicles, third-party vehicles, etc.) that includes, for example, the autonomous vehicle 102. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the autonomous vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with the operation of one or more vehicles (e.g., a fleet of vehicles), with the provision of vehicle services, and/or other operations as discussed herein.

For example, the operations computing system 104 can be configured to monitor and communicate with the autonomous vehicle 102 and/or its users to coordinate a vehicle service provided by the autonomous vehicle 102. To do so, the operations computing system 104 can manage a database that stores data including vehicle status data associated with the status of vehicles including autonomous vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or cargo, etc.), and/or the state of objects internal and/or external to a vehicle (e.g., the physical dimensions and/or appearance of objects internal/external to the vehicle).

The operations computing system 104 can communicate with the one or more remote computing devices 106 and/or the autonomous vehicle 102 via one or more communications networks including the communications network 108. The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the autonomous vehicle 102.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the autonomous vehicle 102 including exchanging (e.g., sending and/or receiving) data or signals with the autonomous vehicle 102, monitoring the state of the autonomous vehicle 102, and/or controlling the autonomous vehicle 102. The one or more remote computing devices 106 can communicate (e.g., exchange data and/or signals) with one or more devices including the operations computing system 104 and the autonomous vehicle 102 via the communications network 108.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the autonomous vehicle 102 including a location (e.g., latitude and longitude), a velocity, acceleration, a trajectory, and/or a path of the autonomous vehicle 102 based in part on signals or data exchanged with the autonomous vehicle 102. In some implementations, the operations computing system 104 can include the one or more remote computing devices 106.

The autonomous vehicle 102 can be a ground-based vehicle (e.g., an automobile, bike, scooter, other light electric vehicle, etc.), an aircraft, and/or another type of vehicle. The autonomous vehicle 102 can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the autonomous vehicle 102 can provide driving and navigational operation with minimal and/or no interaction from a human driver present in the vehicle. A semi-autonomous operational mode can be one in which the autonomous vehicle 102 can operate with some interaction from a human driver present in the vehicle. Park and/or sleep modes can be used between operational modes while the autonomous vehicle 102 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the autonomous vehicle 102. Additionally, the autonomous vehicle 102 can provide data indicative of the state of the vehicle, the state of one or more passengers of the vehicle, and/or the state of an environment to the operations computing system 104, which can store an indication, record, and/or other data indicative of the state of the one or more objects within a predefined distance of the autonomous vehicle 102 in one or more memory devices associated with the operations computing system 104 (e.g., remote from the vehicle). Furthermore, the autonomous vehicle 102 can provide data indicative of the state of the one or more objects (e.g., physical dimensions and/or appearance of the one or more objects) within a predefined distance of the autonomous vehicle 102 to the operations computing system 104, which can store an indication, record, and/or other data indicative of the state of the one or more objects within a predefined distance of the autonomous vehicle 102 in one or more memory devices associated with the operations computing system 104 (e.g., remote from the vehicle).

The autonomous vehicle 102 can include and/or be associated with the vehicle computing system 112. The vehicle computing system 112 can include one or more computing devices located onboard the autonomous vehicle 102. For example, the one or more computing devices of the vehicle computing system 112 can be located on and/or within the autonomous vehicle 102. The one or more computing devices of the vehicle computing system 112 can include various components for performing various operations and functions. For instance, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the autonomous vehicle 102 (e.g., its computing system, one or more processors, and other devices in the autonomous vehicle 102) to perform operations and functions, including those described herein.

As depicted in FIG. 1, the vehicle computing system 112 can include one or more sensors 114, the positioning system 118, the autonomy computing system 120, the communication system 136, the vehicle control system(s) 138, and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The sensor(s) 114 can include a plurality of external sensors (e.g., LiDAR sensors, outward facing cameras, etc.) and/or internal sensors (e.g., tactile sensors (e.g., touch sensors within seats of a vehicle interior, on the handle of a vehicle door, etc.), internal facing microphones, internal facing cameras, etc.). As discussed herein, the internal sensor(s) and/or external sensor(s) can be utilized by the vehicle computing system 112 to gather internal sensor data associated with a vehicle 102 such as, for example, occupancy data identifying the state (e.g., the position and/or orientation) of one or more passengers riding within the vehicle 102.

More particularly, the vehicle computing system 112 can include and/or be associated with a plurality of external sensors (e.g., LiDAR sensors, outward facing cameras, etc.) and/or interior sensors (e.g., internal facing cameras/heat sensors, internal facing microphones, tactile sensors (e.g., touch sensors within seats of a vehicle interior, on the handle of a vehicle door, etc.), etc.). The sensor(s) 114 can be located on various parts of the autonomous vehicle 102 including the vehicle interior, a front side, rear side, left side, right side, top, or bottom of the vehicle body, etc. For instance, the sensor(s) 114 can be placed throughout the vehicle to obtain sensor data indicative of the presence of objects and/or humans currently and/or predicted to be within and/or proximate to the vehicle's interior. The sensor data, for example, can be obtained by the interior sensors such as one or more cameras configured to obtain image data, one or more microphones configured to obtain auditory data, one or more tactile sensors configured to obtain tactile data (e.g., to detect a touch to a seat to determine whether an object and/or passenger is placed on or sitting in a passenger seat, etc.), heat sensor(s), weight sensor(s), etc. In addition, or alternatively, the sensor data can be obtained by the external sensors such as one or more external sensors configured to detect a passenger or object in the process of entering and/or exiting the vehicle's interior. For instance, the external sensors can include infrared sensors that wrap around the vehicle's body (e.g., a side of the vehicle that includes an entry and/or exit to the vehicle, etc.), camera(s), LiDAR sensors, microphones, tactile sensors (e.g., to detect a touch to a door (e.g., a handle of the door) of the vehicle, etc.), etc. In addition, other sensors can be utilized to generate and/or obtain sensor data such as, for example, ultrasonic sensors, RADAR sensor (e.g., placed along the side of the vehicle, etc.) and/or any other sensor capable of generating and/or obtaining data indicative of an object and/or passenger's proximity to the vehicle 102.

The vehicle computing system 112 can be configured to process the sensor data 116 to detect objects and/or passengers (e.g., an elbow, hand, foot, etc.) relative to an area (e.g., zone) within the vehicle interior and/or an entry or exit of the vehicle's interior. By way of example, the vehicle computing system 112 can utilize one or more sensor processing models (image processing and/or or any other sensor processing model(s)) configured to detect the objects and/or passengers. For instance, the sensor processing models can include one or more machine-learned models learned to analyze the sensor data 116 and/or one or more portions of the sensor data 116 and output an indication of the location, heading, and/or other information for any passenger(s) and/or object(s) proximate to or within the vehicle 102.

In some implementations, the sensor processing models can include multiple machine-learned models configured to output the same and/or similar information based on one or more different portions of the sensor data 116 (e.g., detection information based on image data, detection information based on tactile data, etc.). The redundancy from multiple sensor suites and/or processing models can confirm and/or increase the vehicle computing system's confidence in the detection of the one or more objects and/or passengers. In some implementations, the sensor processing models can include the same machine-learned models used by one or more perception 124 and/or predictions systems 126 of the autonomy computing system 120 (as described in further detail below). In addition, or alternatively, the sensor processing models can include different machine-learned models that use algorithms/models similar to the models used by the one or more perception 124 and/or prediction systems 126.

In some implementations, the vehicle 102 can include one or more sensory cues (e.g., visual cues such as paint, contouring, lighting, etc.) on one or more interior (e.g., passenger seats, etc.) and/or exterior (e.g., passenger doors, etc.) components of the vehicle 102. The sensory cues can be used to enhance the detection accuracy of the one or more sensor processing models. For example, the one or more sensory cues can give a frame of reference for one or more portions of the vehicle 102. By way of example, as discussed in greater detail herein, the vehicle 102 can include a plurality of zones identifying different portions of the vehicle 102. In some implementations, the vehicle 102 can include one or more sensory cues that define each of the plurality of portions. By way of example, the sensory cues can include paint, electrical signals, reflective surfaces, edging/contouring, etc. that identify a particular portion (e.g., a door, a front portion of the vehicle interior, etc.) of the vehicle 102. In this manner, the one or more sensor processing models can compare the location of one or more objects and/or passengers relative to the one or more sensory cues to determine whether an object and/or passenger is located proximate to one or more zones of the vehicle.

The sensor(s) 114 can be configured to generate and/or store data including the sensor data 116. The sensor data 116 can include the internal sensor data, external sensor discussed above, and well an autonomy sensor data associated with one or more objects that are proximate to the autonomous vehicle 102 (e.g., within range or a field of view of one or more of the one or more sensors 114 (e.g., external sensor(s)). For instance, the sensor(s) 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy sensor data can include image data, radar data, LIDAR data, and/or other data acquired by the sensor(s) 114. The one or more objects can include, for example, pedestrians, vehicles, bicycles, and/or other objects. The autonomy sensor data can be indicative of locations associated with the one or more objects within the surrounding environment of the autonomous vehicle 102 at one or more times. For example, the autonomy sensor data can be indicative of one or more LIDAR point clouds associated with the one or more objects within the surrounding environment. The sensor(s) 114 can provide autonomy sensor data to the autonomy computing system 120.

In addition to the sensor data 116, the autonomy computing system 120 can retrieve or otherwise obtain data including the map data 122. The map data 122 can provide detailed information about the surrounding environment of the autonomous vehicle 102. For example, the map data 122 can provide information regarding: the identity and location of different roadways, road segments, buildings, or other items or objects (e.g., lampposts, crosswalks and/or curb), the location and directions of traffic lanes (e.g., the location and direction of a parking lane, a turning lane, a bicycle lane, or other lanes within a particular roadway or other travel way and/or one or more boundary markings associated therewith), traffic control data (e.g., the location and instructions of signage, traffic lights, or other traffic control devices), and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the autonomous vehicle 102. The positioning system 118 can be any device or circuitry for analyzing the position of the autonomous vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the autonomous vehicle 102 can be used by various systems of the vehicle computing system 112 and/or provided to one or more remote computing devices (e.g., the operations computing system 104 and/or the remote computing device 106). For example, the map data 122 can provide the autonomous vehicle 102 relative positions of the surrounding environment of the autonomous vehicle 102. The autonomous vehicle 102 can identify its position within the surrounding environment (e.g., across six axes) based at least in part on the data described herein. For example, the autonomous vehicle 102 can process the autonomy sensor data (e.g., LIDAR data, camera data) to match it to a map of the surrounding environment to get an understanding of the vehicle's position within that environment (e.g., transpose the autonomous vehicle's 102 position within its surrounding environment).

The autonomy computing system 120 can include a perception system 124, a prediction system 126, a motion planning system 128, and/or other systems that cooperate to perceive the surrounding environment of the autonomous vehicle 102 and determine a motion plan for controlling the motion of the autonomous vehicle 102 accordingly. In some examples, many of the functions performed by the perception system 124, prediction system 126, and motion planning system 128 can be performed, in whole or in part, by a single system and/or multiple systems that share one or more computing resources. For instance, one or more of the perception system 124, prediction system 126, and motion planning system 128 can be combined into one system configured to perform the functions of each of the systems. In addition, or alternatively, the one or more of the perception system 124, prediction system 126, and motion planning system 128 can be configured to share and/or have access to one or more common computing resources (e.g., a shared memory, communication interfaces, processors, etc.).

As an example, the autonomy computing system 120 can receive the sensor data 116 from the one or more sensors 114, attempt to determine the state of the surrounding environment and/or the vehicle's interior by performing various processing techniques on the sensor data 116 (and/or other data). The autonomy computing system 120 can generate an appropriate motion plan through the surrounding environment based on state of the surrounding environment and the vehicle's interior. In some examples, the autonomy computing system 120 can use the sensor data 116 as input to a one or more machine-learned models that can detect objects within the sensor data 116, forecast future motion of those objects, and select an appropriate motion plan for the autonomous vehicle 102. The machine-learned model(s) can be included within one system and/or share one or more computing resources.

As another example, the perception system 124 can identify one or more objects that are proximate to and/or within the autonomous vehicle 102 based on sensor data 116 received from the sensor(s) 114. In particular, in some implementations, the perception system 124 can determine, for each object, state data 130 that describes the current state of such object. As examples, the state data 130 for each object can describe an estimate of the object's: current location (e.g., relative to one or more interior vehicle components, the surrounding environment of the vehicle, etc.); current speed; current heading (which may also be referred to together as velocity); current acceleration; current orientation (e.g., with respect to the direction of travel of the vehicle, etc.); size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 124 can determine state data 130 for each object over a number of iterations. In particular, the perception system 124 can update the state data 130 for each object at each iteration. Thus, the perception system 124 can detect and track objects (e.g., vehicles, bicycles, pedestrians, etc.) that are proximate and/or within the autonomous vehicle 102 over time, and thereby produce a presentation of the world around and within the vehicle 102 along with its state (e.g., a presentation of the objects of interest within a scene/vehicle interior at the current time along with the states of the objects).

The prediction system 126 can receive the state data 130 from the perception system 124 and predict one or more future locations and/or moving paths for each object based on such state data 130. For example, the prediction system 126 can generate prediction data 132 associated with each of the respective one or more objects proximate and/or within the vehicle 102. The prediction data 132 can be indicative of one or more predicted future locations of each respective object. The prediction data 132 can be indicative of a predicted path (e.g., predicted trajectory) of at least one object within the interior and/or the surrounding environment of the autonomous vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the autonomous vehicle 102 based at least in part on the prediction data 132 (and/or other data). The motion plan data 134 can include vehicle actions with respect to the objects proximate to the autonomous vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the autonomous vehicle 102 can perform a certain action (e.g., pass an object) without increasing the potential risk to the autonomous vehicle 102 and/or violating any traffic laws (e.g., speed limits, lane boundaries, signage). The motion plan data 134 can include a planned trajectory, velocity, acceleration, and/or other actions of the autonomous vehicle 102.

As one example, in some implementations, the motion planning system 128 can determine a cost function for each of one or more candidate motion plans for the autonomous vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 102 approaches impact with another object and/or deviates from a preferred pathway (e.g., a predetermined travel route).

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle control system 138 that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the autonomous vehicle 102.

The vehicle computing system 112 can include a communications system 136 configured to allow the vehicle computing system 112 (and it's one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the systems on-board the autonomous vehicle 102. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include one or more human-machine interfaces 140. For example, the vehicle computing system 112 can include one or more display devices located on the vehicle computing system 112. A display device (e.g., screen of a tablet, laptop, and/or smartphone) can be viewable by a user of the autonomous vehicle 102 that is located in the front of the autonomous vehicle 102 (e.g., driver's seat, front passenger seat). Additionally, or alternatively, a display device can be viewable by a user of the autonomous vehicle 102 that is located in the rear of the autonomous vehicle 102 (e.g., a passenger seat in the back of the vehicle).

In some implementations, the vehicle computing system 112 can include a seat control system 142 and/or a door control system 144. The seat control system 142 can be configured to control the operation of one or more configurable seats positioned within the interior of the autonomous vehicle 102. For instance, the seat control system 142 can include one or more actuators (e.g., electric motors) configured to control movement of the one or more configurable seats. As will be discussed herein, the seat control system 142 can configure the interior of the autonomous vehicle 102 to accommodate a plurality of different seating configurations.

The door control system 144 can be configured to control the operation of one or more door assemblies to permit access to the interior of the vehicle 102. For instance, the door control system 144 can include one or more actuators (e.g., electric motors) configured to control movement of the door assembly(s). More specifically, the one or more actuators can move the one or more door assemblies between an open position and a closed position to permit selective access to the interior of the autonomous vehicle 102. In addition, or alternatively, the door control system 144 can be configured to selectively lock and/or unlock the door assembly(s). In such a case, the door assembly(s) can permit the movement (e.g., from a closed position to an open position and/or vice versa) of the door assembly(s) when unlocked and prevent movement of the door assembly(s) when unlocked.

Figure 2:
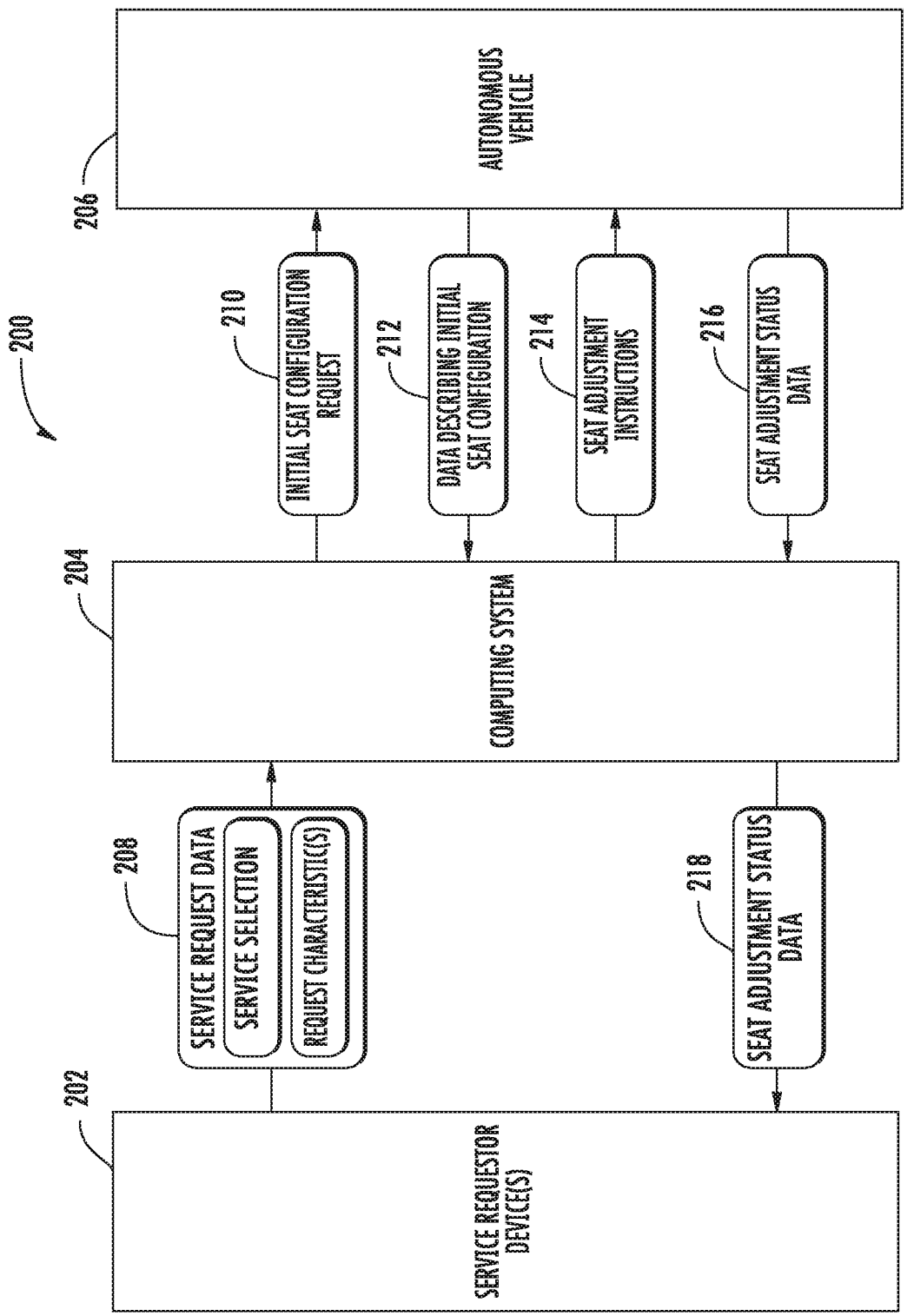
FIG. 2 depicts a data flow diagram for generating and providing seat adjustment instructions to an autonomous vehicle according to example implementations of the present disclosure.

FIG. 2 depicts a data flow diagram 200 for generating and providing seat adjustment instructions to an autonomous vehicle according to example implementations of the present disclosure. More particularly, service requestor device(s) 202 can send service request data 208 to computing system 204. Service requestor device(s) 202 can be any device (e.g., smartphone, tablet, smart device, computing device, etc.) associated with and/or corresponding to a user of an autonomous vehicle service (e.g., a rideshare service, delivery service, transportation service, courier service, etc.). The service request data 208 can be sent via any network and/or transmission medium (e.g., WiFi, cellular network(s), etc.). The service request data 208 can include a service selection and one or more request characteristics. The service selection can indicate a particular service selected by the requestor(s) associated with the service requestor device(s) 202. The service selection of the service request data 208 can be a service selected from a plurality of services offered by an autonomous vehicle service associated with computing system 204 (e.g., food delivery, autonomous human passenger transportation, pooled transportation service, delivery services, courier services, etc.). As an example, the service request data 208 can indicate an autonomous vehicle transportation service at a highest service tier of a number of service tiers (e.g., a more luxurious transportation service, etc.). As another example, the service request data 208 may indicate a pooled transportation service (e.g., a transportation service pooled amongst a number of passengers submitting separate service request data 208).

The service request data 208, associated with the service requestor device 202, can include one or more request characteristics. The request characteristic(s) can describe aspect(s) of the user(s) of the service requestor device(s) and/or the selected service. In some implementations, the request characteristic(s) can describe an expected occupancy. As an example, the request characteristic(s) can indicate if a user of the service requestor device 202 has indicated additional passengers for an autonomous transportation service (e.g., children, family members, friends, etc.). In some implementations, the expected occupancy can include occupancy predictions associated with the service selection. As an example, a computing system (e.g., computing system 204) may determine (e.g., using machine-learned model(s), passenger data, etc.) that the user of the service requestor device 202 generally travels with more than one person. As another example, the expected occupancy predictions may indicate a certain number of predicted occupants based on the service selection (e.g., a service selection for a certain tier of an autonomous transportation service, a pooled transportation service selection, etc.). The expected occupancy predictions can be generated using various methods by computing system 204 (e.g., machine-learning techniques, deterministic prediction algorithms, etc.).

The computing system 204 can receive the service request data 208. The computing system 204 can be any number of computing systems and/or devices associated with the autonomous vehicle service. As an example, the computing system 204 can be or otherwise include the operations computing system(s) 104 of FIG. 1. As another example, the computing system 204 can be or otherwise include a third-party intermediary system (e.g., of a third party autonomous vehicle provider, etc.) configured to directly interface with computing systems of the autonomous vehicle service (e.g., through one or more application programming interfaces, etc.).

The computing system 204 can generate an initial seat configuration request 210. The initial seat configuration request 210 can be configured to request data describing an initial seat configuration for an autonomous vehicle 206 (e.g., the vehicle 102 of FIG. 1, etc.). In response, the autonomous vehicle 206 can send data describing the initial seat configuration 212 to the computing system 204. Alternatively, in some implementations, the data describing the initial seat configuration 212 can be obtained from a computing system associated with the autonomous vehicle 206 (e.g., a third-party computing system, a routing computing system, etc.). Alternatively, in some implementations, if the computing system is an autonomous vehicle computing system (e.g., a computing system located onboard the autonomous vehicle 206, etc.) the data describing the initial seat configuration 212 can be obtained from the sensors and/or a computing device of the autonomous vehicle 206.

The initial seat configuration data 212 can describe, for each seat of the autonomous vehicle, a seat position for the seat within the cabin of the autonomous vehicle 206. The seat position for the seat within the cabin can be a longitudinal and/or lateral position inside the cabin of the autonomous vehicle 206. As an example, if viewing the exterior doors of the autonomous vehicle 206, the seat can be located longitudinally along the side of the autonomous vehicle 206. More particularly, the seat position can correspond to a position on a track (e.g., a seat track located in the floor of the autonomous vehicle 206, etc.) that spans the interior of the autonomous vehicle 206. The seat position can be reconfigured by moving the seat along the seat track inside the autonomous vehicle 206. In such fashion, the seat position of the initial seat configuration data 212 can describe a longitudinal position on the track located in the floor of the autonomous vehicle 206.

It should be noted that, in some implementations, not all seats of the autonomous vehicle 206 are necessarily connected to the track inside the floor of the autonomous vehicle 206. Instead, the seat position can describe a folded position of a seat in the autonomous vehicle 206 that is not connected to a track inside the autonomous vehicle 206. More particularly, a first seat of the autonomous vehicle 206 can be configured to fold forward to attach to the back of a second seat of the autonomous vehicle 206. Further, the first seat can be configured to unfold from the back of the seat to a default seat position. In such fashion, one seat can fold and unfold from the back of another seat inside the autonomous vehicle 206.

The initial seat configuration data 212 for each seat of the autonomous vehicle 206 can include seat orientation data for each of the seats in the autonomous vehicle 206. The seat orientation data can include a backrest, a seat base, and/or a headrest orientation. The seat backrest can be the back-support component of the seat. The seat backrest orientation can be configured to move about an angle where the seat backrest attaches to a seat base of the seat. As an example, the seat backrest can fold to be parallel to the seat base of the seat. As another example, the seat backrest can be positioned to be perpendicular to the seat base of the seat. The seat base, similar to the seat back, can move about an angle of the seat to adjust a sitting angle. Additionally, the seat base can move longitudinally about an axis. The seat orientation can define the direction in which an accompanying passenger would be facing.

In some implementations, the seat base can be moved concurrently with the seat backrest to switch a facing direction of the seat. As an example, the seat can be facing a first direction (e.g., a passenger sitting in the seat would be looking in the first direction). The seat backrest can move in conjunction with the seat base such that the seat can subsequently face a second direction opposite that of the first direction (e.g., facing away from one another).

The seat orientation data can describe an orientation of the headrest of a seat. The orientation of the headrest can correspond to a lateral position of the headrest of the seat. More particularly, the headrest orientation can refer to a degree of retraction of the headrest into the backrest of the seat. As an example, the headrest can be oriented to fully retract inside the backrest of the seat (e.g., to facilitate configuration of the seat into a table configuration, etc.). As another example, the headrest orientation can be configured to fully extend outside the backrest of the seat After receiving the data describing the initial seat configuration 212, the computing system 204 can generate seat adjustment instructions 214 for the autonomous vehicle 206. The seat adjustment instructions 214 can be based on the data describing the initial cabin configuration 212 and the service request data 208. The seat adjustment instructions 214 can be configured to adjust an initial seat configuration of at least one seat of the plurality of seats inside the cabin of the autonomous vehicle 206. In some implementations, the seat adjustment instructions 214 can be configured to adjust the initial seat configuration to maximize an amount of cabin space (e.g., based on the service request, etc.) in the autonomous vehicle 206. The seat adjustment instructions 214 can do so by adjusting the initial seat configuration so that the seats are positioned on the longitudinal edges of the cabin of the autonomous vehicle 206. For example, the seat adjustment instructions 214 can be configured to adjust a seat back orientation, a headrest orientation, a seat bottom orientation, and/or a seat position of a seat of the autonomous vehicle 206.

In some implementations, generating the seat adjustment instructions 214 can include detecting, by the computing system 204 using one or more sensors in the cabin of the autonomous vehicle 206, one or more objects inside the cabin of the autonomous vehicle 206. More particularly, the computing system 204 can utilize sensor(s) in the cabin of the autonomous vehicle 206 (e.g., camera(s), weight sensor(s), etc.) to detect objects inside the autonomous vehicle 206 (e.g., forgotten briefcases, toys, smartphones, etc.). Based on the detected objects, the computing system 204 can generate and/or modify the seat adjustment instructions 214. As an example, the computing system 204 can determine, based on the data describing the initial seat configuration 212 and the service request data 208, to fold three seats in a row to a folded position. The computing system 204 can detect a briefcase left by a passenger in the middle seat of the autonomous vehicle 206. In response, the computing system 204 can generate seat adjustment instructions 214 that fold the outer two seats in the row into a folded position while keeping the middle seat (e.g., the seat with the briefcase) in an upright position to avoid damaging the briefcase and/or the seat.

Alternatively, in some implementations, the example described above could instead lead the autonomous vehicle 206 to take a separate action. As an example, if the computing system 204 is located onboard the autonomous vehicle 206, the autonomous vehicle 206 may forego generating any seat adjustment instructions 214. Instead, the autonomous vehicle 206 may provide a notification to the passenger (e.g., the user associated with the service requestor device(s) 202) that are associated with the item (e.g., including it should be removed, has been left, etc.). As another example, the autonomous vehicle 206 may return to a maintenance location so that the object can be removed. It should be noted that the autonomous vehicle 206 can take any sort of action in response to detecting the presence of an object in the interior of the cabin of the autonomous vehicle 206.

The computing system 204 can provide the seat adjustment instructions 214 to the autonomous vehicle 206. In some implementations, the computing system 204 can be separate from the autonomous vehicle 206 and can provide the seat adjustment instructions 214 to the autonomous vehicle 206 by transmitting the instructions (e.g., via networks, associated first and/or third-party computing systems, etc.). Alternatively, in some implementations, the computing system 204 can be included in or otherwise be an autonomous vehicle computing system of the autonomous vehicle 206 (e.g., the vehicle computing system 112 of FIG. 1, etc.), and can therefore directly adjust the seats of the autonomous vehicle 206 based on the seat adjustment instructions 214.

It should be noted that, in some implementations, the autonomous vehicle 206 can be configured to adjust the seats of the autonomous vehicle 206 based on the seat adjustment instructions 214 before passenger(s) enter the autonomous vehicle 206. More particularly, the autonomous vehicle 206 can begin and complete seat reconfiguration (e.g., based on the adjustment instructions 214) before allowing occupants to enter the vehicle. In such fashion, the autonomous vehicle 206 can prevent any accidental injury to passengers accessing the autonomous vehicle 206.

The computing system 204 can receive seat adjustment status data 216 from the autonomous vehicle 206. The seat adjustment status data 216 can describe any aspect of the utilization of the seat adjustment instructions 214 by the autonomous vehicle 206. In some implementations, the seat adjustment status data 216 can indicate that the autonomous vehicle 206 was unable to carry out at least some of the seat adjustment instructions 214. As an example, the seat adjustment status data 216 can indicate that the autonomous vehicle 206 did not reconfigure a seat because of an object left in the seat by a passenger. As another example, the seat adjustment status data 216 can indicate that the autonomous vehicle did not reconfigure a seat due to a broken seat configuration mechanism (e.g., a failure in a pneumatic adjustment system of the seat, a foreign object lodged in the track of the seat positioning system, etc.). In some implementations, the seat adjustment status data 216 can include sensor data from any sensors onboard the autonomous vehicle 206.

In some implementations, the computing system 204 can utilize seat adjustment status data 216 to determine the efficiency of various seat configuration(s) (e.g., using machine-learning techniques, etc.). More particularly, the computing system 204 can analyze various performance characteristics (e.g., passenger ingress and/or egress, luggage loading and/or unloading, etc.) based on the seat adjustment status data 216 to determine seat configuration efficiency for facilitating passenger utilization of the autonomous vehicle 206. As an example, seat adjustment status data 216 (e.g., weight sensor data, image data, motion detector data, etc.) can be analyzed to determine that passenger ingress takes more time than average when utilizing a certain seat configuration that corresponds to the seat adjustment instructions 214. Based on the amount of time, the computing system 204 can determine and/or assign a seat configuration efficiency value to the seat configuration described by the seat adjustment instructions 214. The computing system 204 can evaluate the seat efficiency value when generating additional seat adjustment instructions 214 in the future.

The computing system 204 can communicate seat adjustment status data 218 to the service requestor device(s) 202 (e.g., via one or more networks, one or more third-party computing systems, etc.). The seat adjustment status data 218 can utilized by the service requestor device(s) 202 (e.g., via an application of the autonomous service provider associated with computing system 204, etc.) to provide the service requestor(s) with the status of the autonomous vehicle's interior seat configuration. As an example, the seat adjustment status data 216 can indicate that the seat adjustment instructions 214 were at least partially unable to be performed. In response, the seat adjustment status data 218 can be configured to indicate to the service requestor that a preferred and/or requested seat configuration is unavailable. As another example, the seat adjustment status data 216 can indicate that the seat adjustment instructions 214 were successfully performed in full. In response, the seat adjustment status data 218 can be configured to indicate to the service requestor that a preferred and/or requested seat configuration is available. In some implementations, if the seat adjustment status data 218 are configured to indicate to the service requestor that a preferred and/or requested seat configuration is unavailable, the application associated with the autonomous vehicle service provider can additionally prompt the service requestor whether the service requestor would prefer to utilize the autonomous vehicle 206 in the current seat configuration or if the service requestor would prefer to wait for a different autonomous vehicle 206.

FIG. 3 depicts an example of service request data 300 according to example implementations of the present disclosure. Service request data 300 can be or otherwise be included in any form of data structure (e.g., a table, array, etc.). Service request data 300 can include requestor(s) identifier 302. In some implementations, requestor(s) identifier 302 can be identification data associated with one or more users of an autonomous vehicle service provider that requested an autonomous vehicle service (e.g., a transportation service, rideshare service, etc.). As an example, requestor(s) identifier 302 can be a unique user ID for a user of an autonomous vehicle transportation service. As another example, requestor(s) identifier 302 can be a plurality of unique user ID's for a plurality of users that have requested an autonomous vehicle rideshare service (e.g., a pooled rideshare service, etc.). It should be noted that the requestor(s) identifier 302 can be any type or format of identification data that enables identification of the requestor(s) associated with the service request data 300.

The service request data 300 can include service selection 304. The service selection 304 can indicate a particular service from a plurality of services offered by an autonomous vehicle and an associated service provider (e.g., food delivery, autonomous human passenger transportation, pooled transportation service, delivery services, courier services, etc.). As an example, the service selection 304 of the service request data 300 can indicate an autonomous vehicle transportation service at a highest service tier of a number of service tiers (e.g., a more luxurious transportation service, etc.). As another example, the service selection 304 of the service request data 300 may indicate a pooled transportation service (e.g., a transportation service pooled amongst a number of passengers submitting separate service requests).

It should be noted that the autonomous vehicle providing the service selected by the service selection 304 can be an autonomous vehicle capable of a plurality of seat configurations. More particularly, the autonomous vehicle can include one or more seats that can individually or collectively be reconfigured (e.g., reconfiguration of a seat orientation and/or a seat position). As an example, a seat of the autonomous vehicle can change a location inside the autonomous vehicle (e.g., by sliding longitudinally along a track inside the cabin of the autonomous vehicle, etc.). As another example, a seat of the autonomous vehicle can change an orientation inside the autonomous vehicle (e.g., fully retracting a headrest in the seat, changing an angle of the seat back of the seat, folding the seat back onto the seat base of the seat to form a table, etc.). In such fashion, the seating arrangement of seats in the autonomous vehicle can be dynamically reconfigured to more efficiently provide a number of different services.

The service request data 300, associated with a service requestor(s) service request, can include one or more request characteristics 306. The request characteristic(s) 306 can describe aspect(s) of the requestor(s) (e.g., identified by requestor(s) identifier 302) and/or the selected service (e.g., indicated by service selection 304, etc.). In some implementations, the request characteristic(s) 306 can describe an expected occupancy. Additionally, or alternatively, in some implementations, the request characteristic(s) 306 can include passenger preferences, user-specified requests, historical data, start location(s), end location(s), route features, and/or trip duration. The specific implementation of request characteristic(s) 306 will be discussed in greater detail with regards to FIG. 4.

FIG. 4 depicts an example of request characteristic(s) data 400 according to example implementations of the present disclosure. Request characteristic(s) data 400 can be or otherwise be included in any form of data structure (e.g., a table, array, etc.). Request characteristic(s) data 400 can include requestor(s) identifier 402, which can be analogous to or the same as requestor(s) identifier 302 as described in FIG. 300.

The request characteristic(s) data 400 can include expected occupancy data 404. As an example, the expected occupancy data 404 can indicate if a requestor of the service has indicated additional passengers for an autonomous transportation service (e.g., children, family members, friends, etc.). In some implementations, the expected occupancy data 404 can include occupancy predictions associated with the selected service. As an example, the computing system may determine (e.g., using machine-learned model(s), passenger data, etc.) that a service requestor generally travels with more than one person. As another example, the expected occupancy data 404 predictions may indicate a certain number of predicted occupants based on the service selection (e.g., a service selection for a certain tier of an autonomous transportation service, a pooled transportation service selection, etc.). The expected occupancy data 404 predictions can be generated using various methods by the computing system (e.g., machine-learning techniques, deterministic prediction algorithms, etc.).

The request characteristic(s) data 400 can include passenger preferences data 406. Passenger preferences data 406 can indicate a requestor(s) preferred seat configuration for a vehicle. It should be noted that passenger preference data 406 can refer to passengers of the autonomous vehicle. However, some services do not require a passenger (e.g., a food delivery service, etc.) and as such, passenger or requestor may be used interchangeably when discussing services of the autonomous vehicle. A "passenger" of the vehicle, as described, can refer to both the requestor of the service (e.g., associated with requestor(s) identifier 402) and any additional occupants of the vehicle. The preferred seat configuration can be based on an analysis of previous data associated with the requestor (e.g., user scores, user satisfaction determinations, previously selected user configurations, etc.). As an example, the passenger preference data 406 may include user score(s) and/or user satisfaction data associated with services previously requested by the requestor. For example, if the requestor previously requested an autonomous transportation service at a certain tier, and the requestor left a poor review for the service after completion, the seat configuration of the autonomous vehicle while providing the service can be disincentivized for selection (by the computing system) for subsequent service requests by the requestor. Moreover, a computing system (e.g., its machine-learned models, etc.) can be receive user rating(s), review(s), etc. as a feedback process to learn which seat configurations were positively received by user(s) and which seat configurations were negatively received by user(s). The computing system can re-train/re-learn and adjust a certain seat configuration for a selected service in hopes of decreasing the amount of future negative feedback.

In some implementations, the passenger preference data can include preferences for two or more passengers of the autonomous vehicle transportation service. As an example, two requestors may request an autonomous vehicle pooled rideshare service. The passenger preference data can include specific passenger preference data for each of the two requestors. As another example, a single requestor can request an autonomous vehicle transportation service, and the service request can indicate the identity of two additional passengers. The passenger preference data can include specific passenger preference data for each of the two additional passengers.

In some implementations, the computing system can aggregate the passenger preference data 406 for a number of passengers of the autonomous vehicle. More particularly, the passenger preference data 406 can be aggregated such that the aggregated passenger preference data 406 indicates a seat configuration preference that satisfies the most passengers. As an example, four passengers can be utilizing an autonomous vehicle pooled rideshare service. Passenger preference data 406 for three of the passengers can indicate that the passengers prefer a seat configuration where passengers do not face each other. Passenger preference data 406 for one passenger can indicate the passenger prefers a seat configuration where passengers do face each other. The passenger preference data 406 for all four passengers can be aggregated such that the aggregated passenger preference data 406 indicates that the passengers prefer a seat configuration where passengers do not face each other.

In some implementations, the passenger preference data 406 can indicate accessibility configurations required by a passenger. As an example, passenger preference data 406 for a passenger who uses a wheelchair can indicate that the passenger requires a seat configuration accessible to wheelchair-using occupants (e.g., an open seat configuration to facilitate wheelchair access, an extendable wheelchair ramp, etc.). In such fashion, the passenger preference data 406 can be utilized to quickly and efficiently provide accessibility services to passengers who would previously be forced to wait for significant periods of time before a specially configured vehicle was available for them.

The request characteristic(s) data 400 can include user-specified request data 408. In some implementations, the user-specified request data 408 can include user-entered data corresponding to the seat configuration of the autonomous vehicle. As an example, the user-specified request data 408 may specify a certain seat configuration preference for a number of the services of the autonomous vehicle. For example, the user-specified request data 408 may indicate that the user prefers a seat configuration that maximizes cabin space when requesting a highest service tier for an autonomous vehicle transportation service. As another example, the user-specified request data 408 may include a request to opt-out of certain seat configurations. For example, the user-specified request data 408 may include a request that the autonomous vehicle avoid using a passenger-facing seat configuration (e.g., vehicle seats facing one another, etc.) when requesting a highest service tier for an autonomous vehicle transportation service.

The request characteristic(s) data 400 can include historical data 410. The historical data 410 can describe previous passenger preferences and/or behaviors that indicate a preference. As described previously, the historical data 410 can be utilized by the computing system to predict an expected occupancy. As an example, the historical data 410 can indicate that the passenger generally travels with two additional occupants when requesting an autonomous vehicle transportation service. In some implementations, the historical data 410 can indicate previous behavior that indicates preferred configurations. As an example, the historical data 410 may indicate that a passenger generally brings luggage when requesting an autonomous vehicle transportation service to an airport, and therefore prefers a seat configuration that maximizes luggage capacity in the autonomous vehicle when traveling to an airport. The historical data 410 for the passenger can store and utilize any previous preferences and/or behaviors that relate to the selection of an autonomous vehicle seat configuration.

In some implementations, the historical data 410 can indicate a passenger experience level with the autonomous vehicle transportation service. More particularly, the historical data 410 can indicate a number of times the requestor and any associated passengers have utilized various service(s) of the autonomous vehicle service provider. As an example, the historical data 410 can indicate that a requestor (e.g., indicated by requestor(s) identifier 402) has never previously utilized an autonomous vehicle transportation service. In response, the seat configuration can, in some implementations, be adjusted (e.g., via seat adjustment instructions) to increase the comfort of the requestor. As another example, the historical data 410 can indicate that a passenger associated with the requestor has never previously utilized an autonomous vehicle transportation service. In response, the seat configuration can, in some implementations, be adjusted (e.g., via seat adjustment instructions) to increase the comfort of the passenger.

It should be noted that, in some implementations, the passenger preference data 400 and/or historical data 410 associated with a passenger can be analyzed as it is collected, utilized to generate and/or modify seat configuration preferences, and then discarded. More particularly, the passenger preference data 400 may only contain a passenger's predicted seat configuration preferences, without containing any personalized information (e.g., passenger locations, passenger behavior, etc.). As such, the passenger preference data 400 can be utilized to optimally predict the best seat configuration for a passenger without containing any personalized data associated with the passenger.

Additionally, or alternatively, in some implementations, passengers and requestors of services may opt-out of any passenger preference data 400 collection, and/or can opt-out of the collection of specific passenger preference data 400. In some implementations, passengers or requestors of the autonomous vehicle may be required to "opt-in" to passenger preference data collection.

The request characteristic(s) data 400 can include start location data 412 and end location data 414. The start location data 412 and end location data 414 and respectively describe a start and end location of a route. Both the start location data 412 and end location data 414 can indicate location(s) using any conventional coordinate system (e.g., GPS coordinates, etc.).

The request characteristic(s) data 400 can include route feature data 416. Route feature data 416 can describe the route the planned route to be navigated from the start location 412 to the end location 414. In some implementations, the planned route described by the route feature data 416 can be generated by the computing system. Alternatively, in some implementations, the planned route can be generated by an associated computing system that is communicatively coupled to the computing system (e.g., a route planning computing system, operations computing system, etc.). The route feature data 416 can describe one or more features of the planned route. The route feature data 416 can include a highest speed, a type of steering required for the route, a route environment, a route duration, or any other type of information relevant to the route traveled by the autonomous vehicle from the start location to the end location.

As an example, the route feature data 416 can indicate that the route environment is generally considered a scenic route (e.g., based on aggregated passenger preference data, weather data, etc.) that is easily viewed from certain windows of the autonomous vehicle (e.g., viewing the ocean from the left side of the autonomous vehicle, etc.). As another example, the route feature data 416 may indicate that the route requires a number of sharp cornering maneuvers generally unsuitable for certain seat configurations. As yet another example, the route feature data 416 may indicate that the planned route requires high-speed highway travel that is generally considered unsuitable for certain seat configurations.

In some implementations, the route feature data 416 can be aggregated over time alongside passenger data to better predict the effect of route features (e.g., using machine-learning techniques, etc.). As an example, the computing system can generally associate passenger preference data 406 indicating passenger sickness with route feature data 416 that describes certain seat configurations and high speed cornering. As another example, the computing system can generally associate passenger preference data 406 indicating discomfort with certain seat configurations and highway travel. In such fashion, the computing system can predict an optimal seat configuration based on the route feature data 416 that describes the route features of the planned route.

The request characteristic(s) data 400 can include trip duration data 418. Trip duration data 418 can describe an estimated total duration of the trip, and/or can describe a duration of one or more trip segments of the trip.

FIG. 5 depicts an example of initial seat configuration data 500 according to example implementations of the present disclosure. Initial seat configuration data 500 can be or otherwise be included in any form of data structure (e.g., a table, array, etc.). In some implementations, the initial seat configuration data 500 can be obtained directly from the autonomous vehicle (e.g., via a network, etc.). Alternatively, in some implementations, the initial seat configuration data 500 can be obtained from a computing system associated with the autonomous vehicle (e.g., a third-party computing system, a routing computing system, etc.). It should be noted that the seat configuration data 500, as described, describes the initial seat configuration of one seat. However, in some implementations, the initial seat configuration data 500 can describe the initial seat configuration of multiple or all seats of the autonomous vehicle. Alternatively, in some implementations, if the computing system is an autonomous vehicle computing system (e.g., a computing system located onboard the autonomous vehicle, etc.) the initial seat configuration data 500 can be obtained from the sensors and/or a computing device of the autonomous vehicle.

Initial seat configuration data 500 can include seat position data 502. Seat position data 502 can describe the seat position for a seat within the cabin can be a longitudinal and/or lateral position inside the cabin. As an example, if viewing the exterior doors of the vehicle, the seat can be located longitudinally along the side of the vehicle. More particularly, the seat position described by seat position data 502 can correspond to a position on a track (e.g., a seat track located in the floor of the autonomous vehicle, etc.) that spans the interior of the autonomous vehicle. The seat position described by seat position data 502 can be reconfigured by moving the seat along the seat track inside the autonomous vehicle. In such fashion, the seat position data 502 of the initial seat configuration data 500 can describe a longitudinal position on the track located in the floor of the autonomous vehicle.

It should be noted that, in some implementations, not all seats of the autonomous vehicle are necessarily connected to the track inside the floor of the autonomous vehicle. Instead, the seat position data 502 can describe a folded position of a seat in the autonomous vehicle that is not connected to a track inside the autonomous vehicle. More particularly, a seat back of one or more seats (e.g., a third row of seats, etc.) of the autonomous vehicle can be coupled to panel(s) of the autonomous vehicle interior (e.g., aft panel(s) of the autonomous vehicle, etc.). The seat bottom(s) of these one or more seats of the autonomous vehicle can be configured to fold up to a vertical position to be parallel to the seat backs attached to the aft panel of the interior of the autonomous vehicle. Further, the one or more seats can be configured to unfold in the same manner. In such fashion, one or more seat(s) can be coupled to panel(s) of the vehicle interior, and can therefore be enabled to fold and unfold from the back of said interior panel(s).

The initial seat configuration data 500 for the seat of the autonomous vehicle can include seat orientation data 504 for the seat in the autonomous vehicle. The seat orientation described by seat orientation data 504 can describe and/or include seat base orientation data 506, backrest orientation data 508, and headrest orientation data 510. The seat backrest can be the back-support component of the seat. The seat backrest orientation described by backrest orientation data 508 can be configured to move about an angle where the seat backrest attaches to a seat base of the seat. As an example, the seat backrest can fold to be parallel to the seat base of the seat. As another example, the seat backrest can be positioned to be perpendicular to the seat base of the seat. The seat base described by seat base orientation data 506, similar to the seat back, can move about an angle of the seat to adjust a sitting angle. Additionally, the seat base can move longitudinally about an axis.

In some implementations, the seat base described by seat base orientation data 506 can be moved concurrently with the seat backrest to switch a facing direction of the seat. As an example, the seat can be facing a first direction (e.g., a passenger sitting in the seat would be looking in the first direction). The seat backrest can move in conjunction with the seat base such that the seat can subsequently face a second direction opposite that of the first direction (e.g., facing away from one another).

The seat orientation data 504 can describe and/or include headrest orientation data 510 that describes an orientation of the headrest of a seat. The orientation of the headrest can correspond to a lateral position of the headrest of the seat. More particularly, the headrest orientation data 510 can describe to a degree of retraction of the headrest into the backrest of the seat. As an example, the headrest can be oriented to fully retract inside the backrest of the seat (e.g., to facilitate configuration of the seat into a table configuration, etc.). As another example, the headrest orientation can be configured to fully extend outside the backrest of the seat.

Figure 6A:
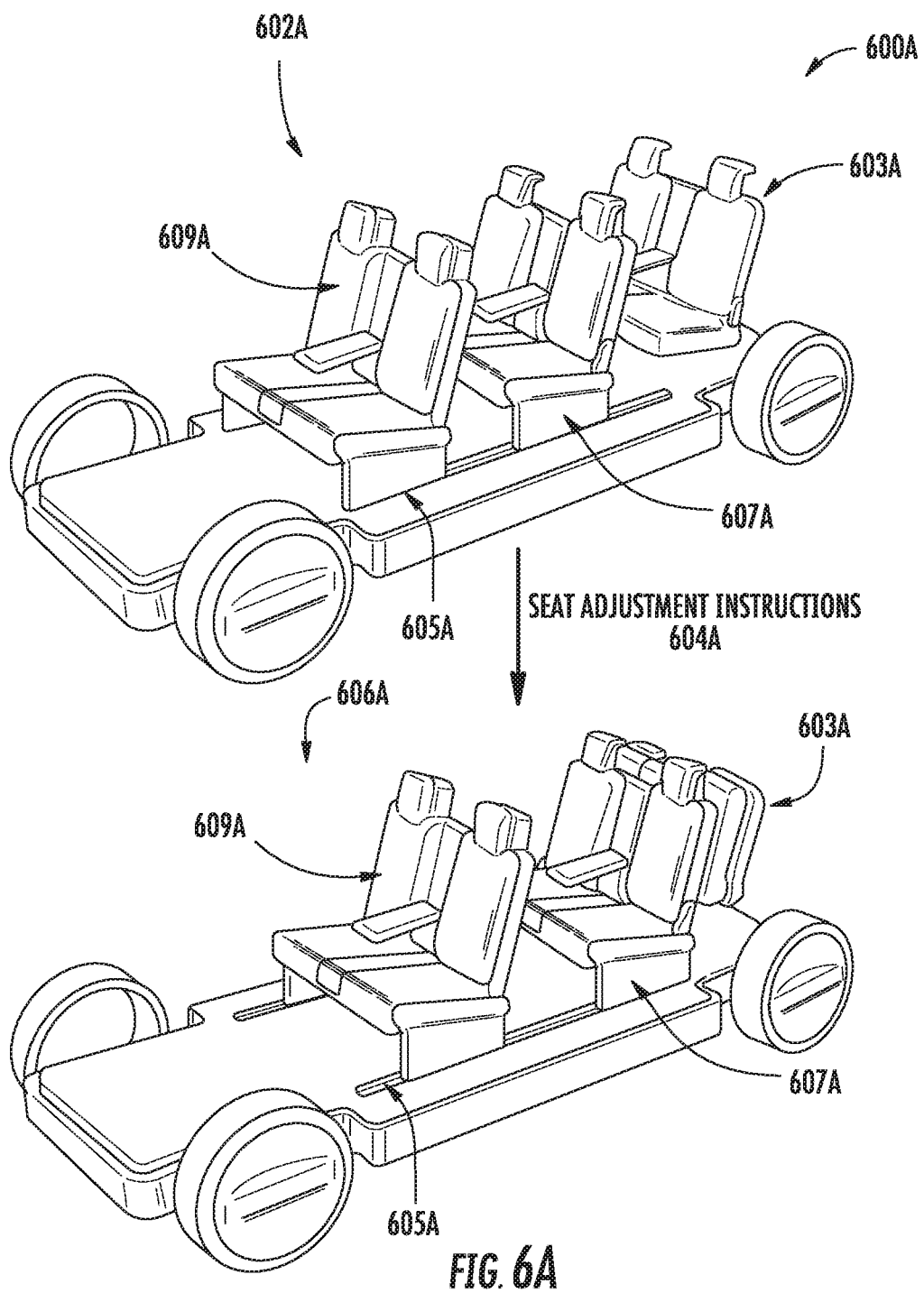
FIG. 6A depicts an example of seat adjustment instructions configured to adjust the seat configurations of an autonomous vehicle to increase cargo capacity of the autonomous vehicle according to example implementations of the present disclosure.

FIG. 6A depicts an example of seat adjustment instructions 604A configured to adjust the seat configurations of an autonomous vehicle 600A to increase cargo capacity of the autonomous vehicle according to example implementations of the present disclosure. Initial seat configuration 602A depicts a seat configuration to maximize the passenger carrying capacity of the autonomous vehicle 600A (e.g., a maximum number of available seats, etc.). As an example, as depicted, the seats of the third seat row 603A are configured in a deployed sitting configuration, and the seat backs of the third seat row 603A are coupled to the aft-most panel(s) of the autonomous vehicle 600A. It should be noted that the third seat row 603A is not attached to the track 605A. Rather, the seat backs of the seats of the third seat row 603A are coupled to the aft panel(s) of the autonomous vehicle 600A to enable an expansion of cabin space for other configurations. Further, first seat row 609A is in the forward-most direction of the seat row track 605A to maximize an amount of space for passengers.

Seat adjustment instructions 604A can be seat adjustment instructions configured to increase a cargo capacity of the autonomous vehicle 600A. The seat adjustment instructions 604A can be provided to the autonomous vehicle 600A. In response, the autonomous vehicle 600A can reconfigure its seats to the reconfigured seat configuration 606A. In configuration 606A, the seat bases of the third passenger seats 603A have been folded to fold parallel with the seat backs of row 603A, which are coupled to the aft panel(s) of the interior of the autonomous vehicle. As an example, the seat bases of the seats of third seat row 603A can fold to be parallel to the seat backs of third seat row 603A. The folded seats of third seat row 603A can be coupled to the aft panel(s) of the vehicle interior of the autonomous vehicle 600A. By folding the seat bases of third row 603A, the first seat row 609A and the second seat row 607A are provided room to move along the seat track 605A towards the rear of the autonomous vehicle 600A, therefore increasing cargo capacity in the front of the autonomous vehicle 600A.

It should be noted that any of the seat rows (e.g., first seat row 609A, second seat row 607A, third seat row 603A, etc.) can be folded in any fashion to enable a configuration that increases cargo capacity of the autonomous vehicle 600A. As such, the selection of the third seat row 603A, and the folding mechanism of third seat row 603A, are depicted merely as an illustrative example. As an example, the first seat row 609A could instead be coupled to fold parallel to the inner surface of the fore panel(s) of the autonomous vehicle 600A, and the third seat row 603A can be a seat row coupled to the seat track 605A.

Figure 6B:
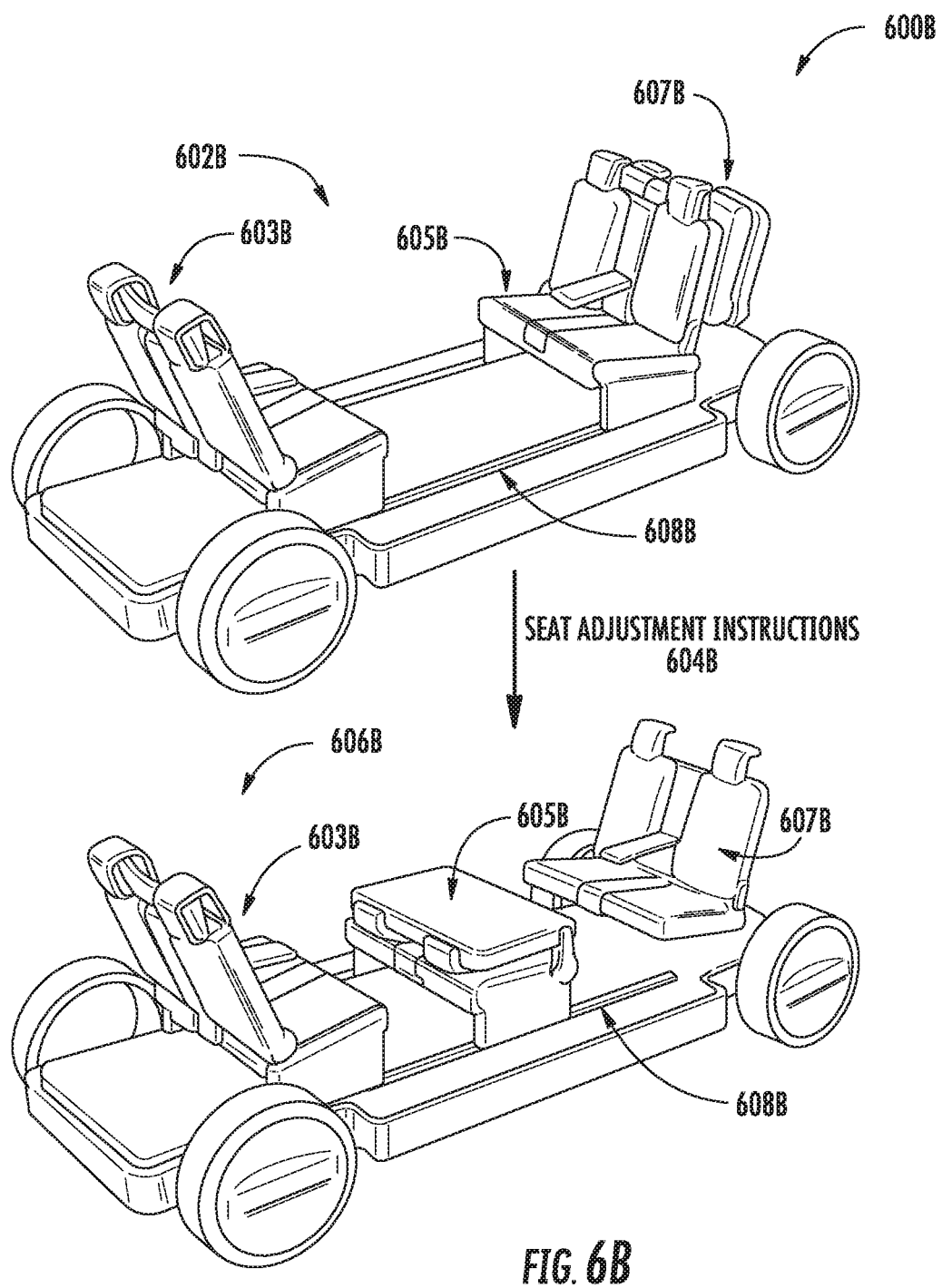
FIG. 6B depicts an example of seat adjustment instructions configured to adjust one or more seat configurations of an autonomous vehicle to a table configuration according to example implementations of the present disclosure.

FIG. 6B depicts an example of seat adjustment instructions 604B configured to adjust one or more seat configurations of an autonomous vehicle 600B to a table configuration according to example implementations of the present disclosure. Initial seat configuration 602B depicts a seat configuration to optimize passenger social interactions in the autonomous vehicle 600A (e.g., facilitating face-to-face conversation between passengers, etc.). As an example, the seats of the first seat row 603B are configured in a deployed sitting configuration, and are directly facing the second seat row 605B (e.g., a passenger sitting in the first seat row 603A is facing a passenger sitting in the second seat row 605B). Third seat row 607B is in a folded configuration and attached to the back of second seat row 605B to maximize an amount of space between seat rows 603B and 605B. Further, first seat row 603B and second seat row 605B are positioned as far away from each other on the seat track 608B as possible to further maximize the space between the respective seat rows.

Seat adjustment instructions 604B can be seat adjustment instructions configured to increase a cargo capacity of the autonomous vehicle 600B. The seat adjustment instructions 604B can be provided to the autonomous vehicle 600B. In response, the autonomous vehicle 600B can reconfigure its seats to the reconfigured seat configuration 606B. In configuration 606B, the third passenger seat 607B has been detached from the back of the second seat row 605B and unfolded to serve in a passenger-capable configuration. As an example, the seat bases of the seats of third seat row 607B have been unfolded to be perpendicular to the seat backs of third seat row 607B. The unfolded seats of third seat row 607B can then couple themselves to the seat track 608B. Alternatively, or additionally, the backs of the unfolded seats of the third seat row 607B can attach to the rear inner surface of the autonomous vehicle 600B. The seat backs of the second seat row 605B can be folded to be parallel to the seat bases of second seat row 605B. More particularly, they can be folded so that the seat backs are flush with the seat bases of second seat row 605B, and that the seat backs and seat bases of second seat row 605B are parallel to the floor of the autonomous vehicle 600B. In such fashion, the rear surface of the seat backs of second seat row 605B can be utilized as a table surface by occupants of first seat row 603B and third seat row 607B.

It should be noted that in some implementations, the second seat row 605B can move along the seat track 608B before and/or after reconfiguration to the table surface configuration depicted in seat configuration 606B. As an example, the second seat row 605B can be reconfigured to the table surface configuration and then can move alongside the track 608B to provide more table surface access to a particular seat row (e.g., 603B, 607B, etc.). For example, the second seat row 605B may move along the track 608B to be closer to the first seat row 603B, therefore providing more table surface access to the occupants of first seat row 603B. For another example, the second seat row 605B may move along the track 608B to be equidistant from both the first seat row 603B and the third seat row 607C, providing equal table access to occupants of both respective rows.

Figure 6C:
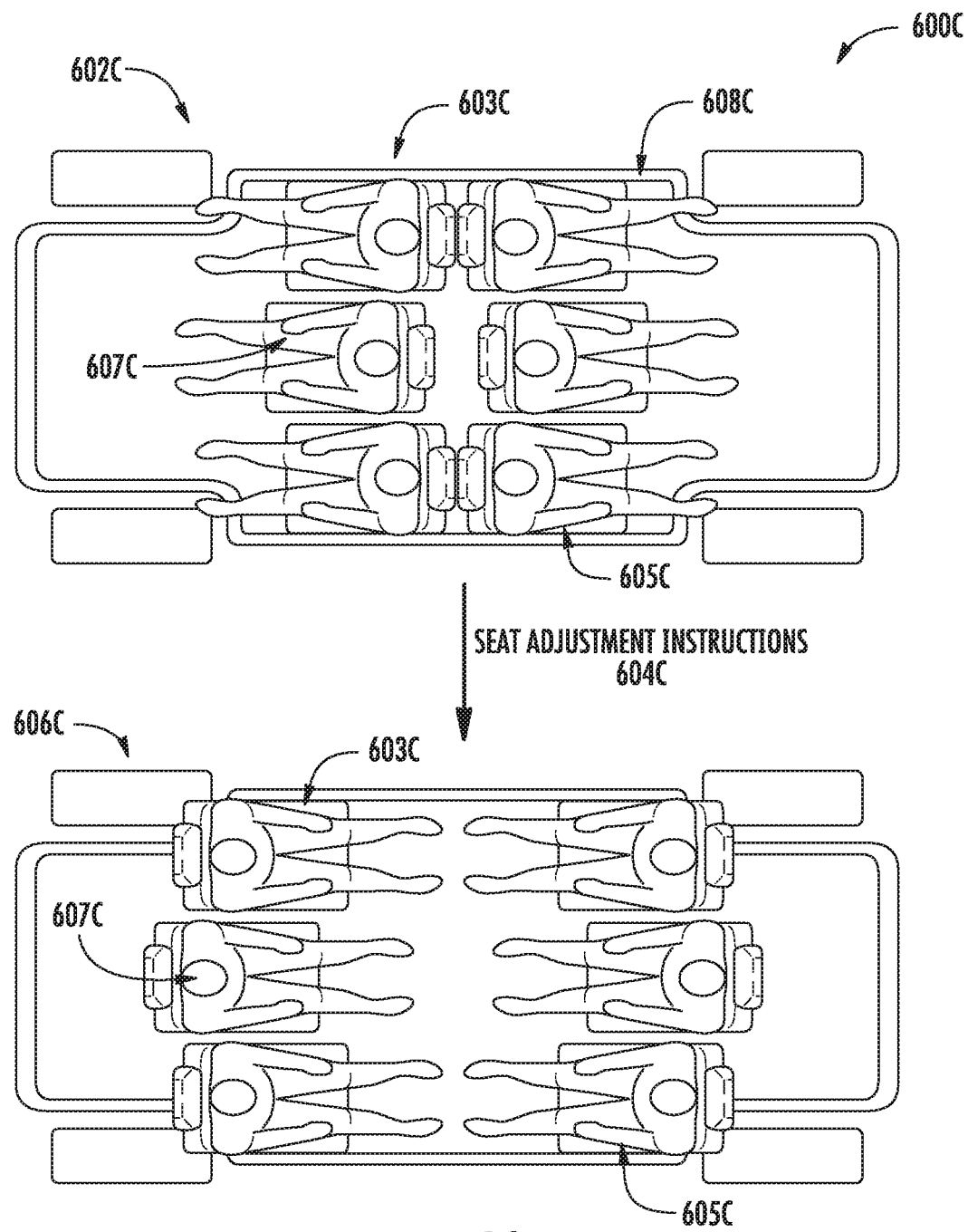
FIG. 6C depicts an example of seat adjustment instructions configured to adjust the seat configurations of an autonomous vehicle to modify the facing direction of one or more seats according to example implementations of the present disclosure.

FIG. 6C depicts an example of seat adjustment instructions 604C configured to adjust the seat configurations of an autonomous vehicle 600C to modify the facing direction of one or more seats according to example implementations of the present disclosure. Initial seat configuration 602C depicts a seat configuration to maximize passenger social privacy in the autonomous vehicle 600C (e.g., minimizing jostling and eye contact between passengers, etc.). As an example, the seats of the first seat row 603C are configured in a deployed sitting configuration, and are facing directly opposite the second seat row 605C (e.g., a passenger sitting in the first seat row 603C is looking in the opposite direction of a passenger sitting in the second seat row 605C). As depicted, the middle seat 607C of first seat row 603C is positioned slightly further forward towards the front of the autonomous vehicle 600C than the other two seats of first seat row 603C. In such fashion, the arms of the occupant of the second seat 607C are moved out of alignment with the arms of other occupants of first seat row 603C, therefore minimizing accidental physical contact between occupants of the first seat row 603C. Additionally, seat rows 603C and 605C are positioned closely to the middle of the autonomous vehicle 600C along the seat track 608C to maximize an amount of leg room for passengers of the seat rows (e.g., 603C, 605C).

It should be noted that the seat offset depicted for seat 607C is merely for depiction, and any number of seat(s) in a seat row can be offset from one another to minimize accidental physical contact between occupants of a seat row. As an example, the seat row 603C could have two seats, and seat 607C could be offset from the second seat of the seat row. Alternatively, each of the two seats in row 603C besides seat 607C could be offset towards the front of the autonomous vehicle 600C. In such fashion, any number of seats in a seat row of the autonomous vehicle 600C can be offset in various fashions to minimize accidental physical contact between occupants of the seat row.

Seat adjustment instructions 604C can be seat adjustment instructions configured to modify the facing direction of the seat rows of the autonomous vehicle 600B. The seat adjustment instructions 604C can be provided to the autonomous vehicle 600C. In response, the autonomous vehicle 600C can reconfigure its seats to the reconfigured seat configuration 606C. In configuration 606C, the seats of first seat row 603C and second seat row 605C have reversed the backrest orientation of each seat so that the seats is facing the opposite direction they faced in seat configuration 602C. As an example, if the seat 607C faced the "front" of the autonomous vehicle 600C in the initial configuration 602C, the seat 607C now faces the "rear" of the autonomous vehicle 600C in the configuration 606C. Further, the first seat row 603C and second seat row 605C have moved along the seat track 608C towards the lateral ends of the autonomous vehicle 600C (e.g., the "front" side, the "rear" side, etc.). In such fashion, the seat adjustment instructions 604C have generated a configuration 600C that maximizes an amount of space between occupants of the autonomous vehicle 600C while also facilitating social communication.

It should be noted that in the second configuration 600C, the seat 607C can still be offset from the other two seats of first seat row 603C. In such fashion, the configuration of first seat row 603C can facilitate communication with occupants of seat row 605C while still minimizing accidental physical contact between the occupants of first seat row 603C.

Figure 7:
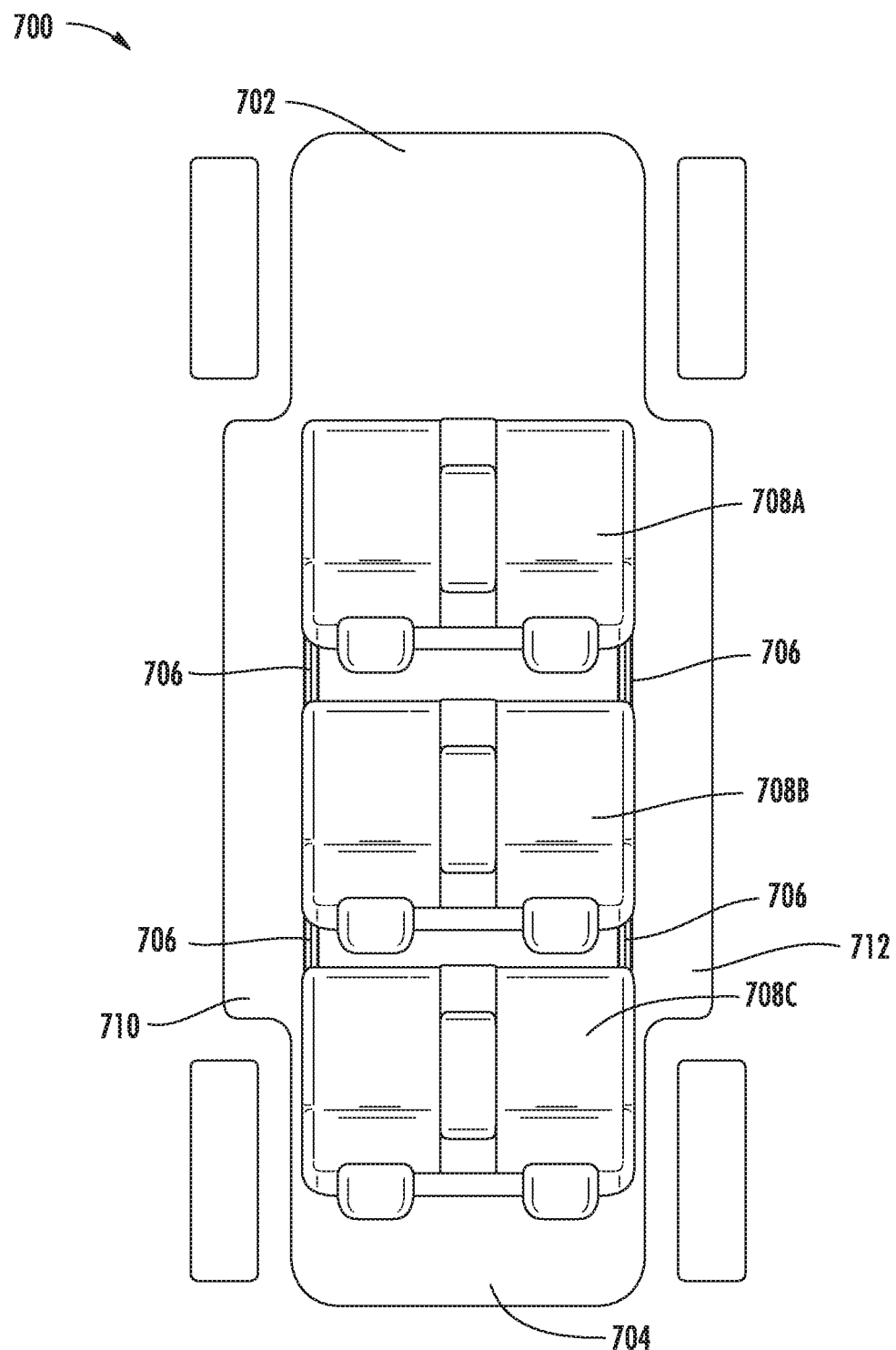
FIG. 7 depicts an example configurable seat layout for an autonomous vehicle according to example implementations of the present disclosure.

FIG. 7 depicts an example configurable seat layout for an autonomous vehicle according to example implementations of the present disclosure. More particularly, autonomous vehicle 700 can include a "frontmost" longitudinal surface 702 and a "rearmost" longitudinal surface 704, and can include a "leftmost" lateral surface 710 and a "rightmost" lateral surface 712. A seat track 706C can span the autonomous vehicle 700 from a longitudinally frontmost lateral point to a longitudinally rearmost point, as depicted. In some implementations, the seat track can span almost the entire longitudinal distance of the autonomous vehicle 700. Alternatively, or additionally, in some implementations, the seat track can also span laterally (e.g., from a lateral surface 710 to a lateral surface 712). In such fashion, the seat track 706 can, in some implementations, allow for both lateral and longitudinal movement of each of the seat rows 708A, 708B, and 708C.

The interior of the autonomous vehicle can include a first seat row 708A, a second seat row 708B, and a third seat row 708C. It should be noted that the number of seat rows depicted is merely illustrative, and that any number, size, or type of seats, seat rows, and/or corresponding seat tracks can be utilized in the autonomous vehicle 700. As an example, a single seat row can be included in the autonomous vehicle 700. As another example, each seat row (e.g., 708A, 708B, 708C, etc.) can each include three seats capable of longitudinal and/or lateral movement along three corresponding tracks. As yet another example, one or more of the seat rows 708A-708C can be replaced with a different interior element, such as a media display terminal (e.g., an interactive tablet surface, etc.), a table, a bed, or any other autonomous vehicle interior element.

In some implementations, the seats of one or more seat rows can be independent from the track 706. As an example, seat row 708C can be a folding seat row that is coupled of the seat backs of seat row 708B, as described in greater detail with regards to FIGS. 6A-6C. It should be noted that each seat of the seat rows 708A, 708B, and 708C can be reconfigurable in a variety of aspects. The specifics of seat reconfiguration will be discussed in greater detail with regards to FIG. 8.

Figure 8:
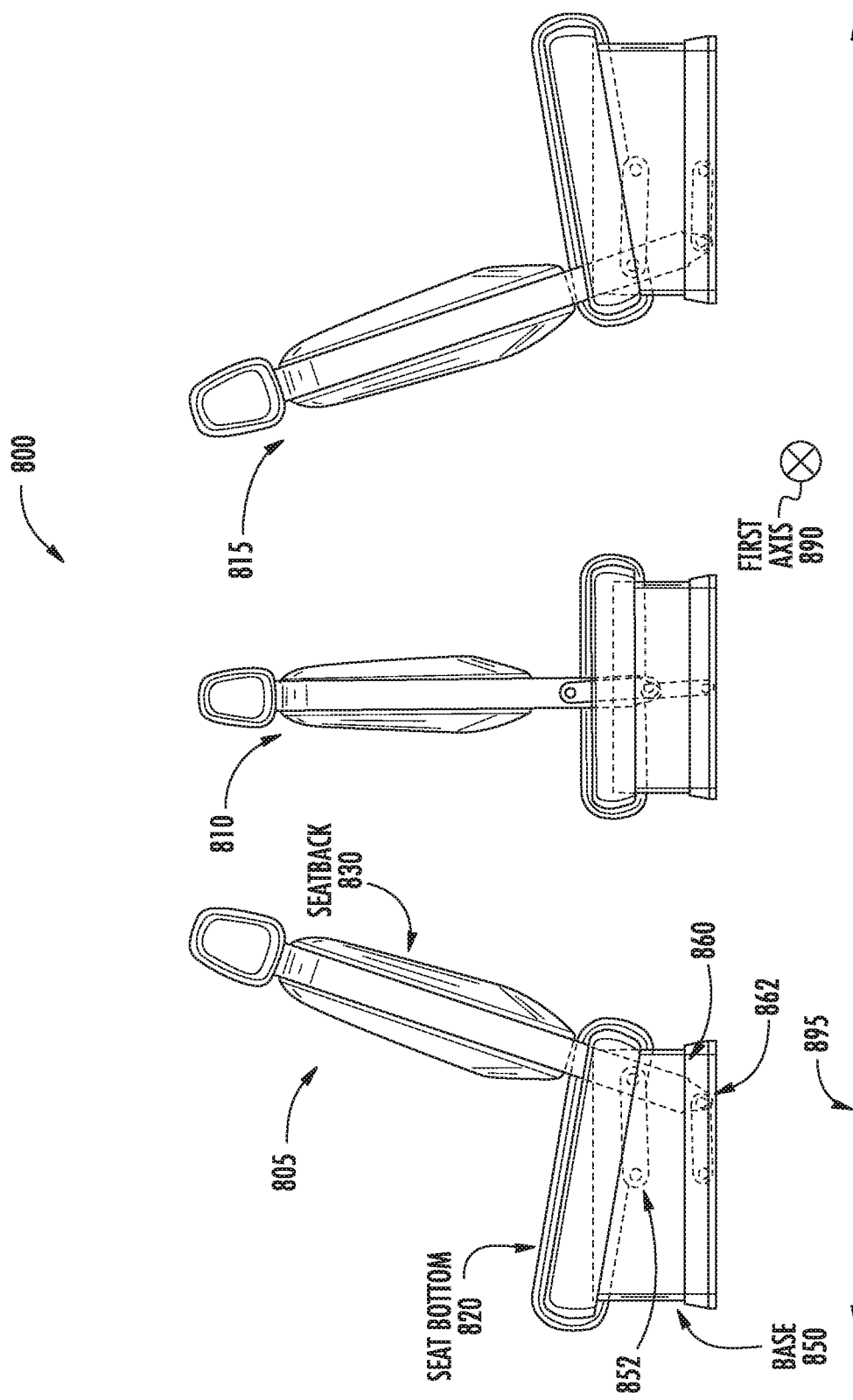
FIG. 8 depicts configurations for a passenger seat of an autonomous vehicle according to example embodiments of the present disclosure.

FIG. 8 depicts configurations for a passenger seat of an autonomous vehicle according to example embodiments of the present disclosure. For example, FIG. 8 depicts deployed configurations for an example passenger seat 800 of an autonomous vehicle according to example embodiments of the present disclosure. The passenger seat 800 can include a base 850 to which the seatback 830 is pivotably coupled. In this manner, the seatback 830 can rotate about pivot point(s) 852, 862 on the base 850 to switch the passenger seat 800 between the first configuration 805 and the second configuration 815, and intermediate configurations 810 therebetween. For instance, the seatback 830 can rotate about the pivot point(s) 852, 862 in a clockwise direction to switch the passenger seat 800 from the first configuration 805, through the intermediate configuration 810, to the second configuration 815. Conversely, the seatback 830 can rotate about the pivot point(s) 852, 862 in a counterclockwise direction to switch the passenger seat 800 from the second configuration 815, through the intermediate configuration 810, to the first configuration 815.

In some implementations, the seat bottom 820 can be pivotably coupled to the base 850 of the passenger seat 800 via one or more linkage arms 860 ("seat linkage arm"). For instance, the seat bottom 820 can be pivotably coupled to the base 850 via linkage arm(s) 860. The linkage arm(s) 860 can be pivotably coupled to the base 850 at the pivot points 852, 862 thereon. In some implementations, the linkage arm(s) 860 can be disposed within a portion of the base 850 having a shape corresponding to a parallelogram. It should be understood, however, that the linkage arm(s) 860 can be disposed at any suitable location on the base 850.

As shown, movement of the linkage arm(s) 860 about the pivot point(s) 852, 862, respectively, can cause the seat bottom 820 to move (e.g., translate) along the second axis 895 of the passenger seat 800. For instance, movement of the linkage arm(s) 860 can cause the seat bottom 820 to initially rotate about the first axis 890 of the passenger seat 800. More specifically, movement of the linkage arm(s) 860 can initially cause the seat bottom 820 to rotate about the first axis 890 until the tilt angle of seat bottom 820 is 0 degrees (e.g., horizontal). The seat bottom 820 can then translate along the second axis 895 until continued movement (e.g., rotation) of the linkage arm(s) 860 again causes the seat bottom 820 to rotate about the first axis 890. More specifically, the continued movement of the linkage arm(s) 860 can cause the seat bottom 820 to rotate such that the seat bottom 820 is no longer horizontal (that is, the tilt angle is not 0 degrees). It should be understood that the seat bottom 820 can be configured to rotate about the first axis 890 when the seatback 830 is, as discussed above, rotating about the pivot point(s) 852, 862 on the base 850 to switch the passenger seat 800 between the first configuration 805, the intermediate configuration 810, and the second configuration 815.

The seatback 830 of the passenger seat 800 and the seat bottom 820 of the passenger seat 800 can rotate in opposing directions to switch the passenger seat 800 between the first configuration 805, the intermediate configuration 810, and the second configuration 815. For instance, the seat bottom 820 can rotate about the first axis 890 in the counterclockwise direction when the seatback 830 is rotating about the pivot point(s) 852, 862 in the clockwise direction to switch the passenger seat 800 from the first configuration 805 to the second configuration 815. Conversely, the seat bottom 820 can rotate about the first axis 890 in the clockwise direction when the seatback 830 is rotating about the pivot point(s) 852, 862 in the counterclockwise direction to switch the passenger seat 800 from the second configuration 815 to the first configuration 805.

Figure 9:
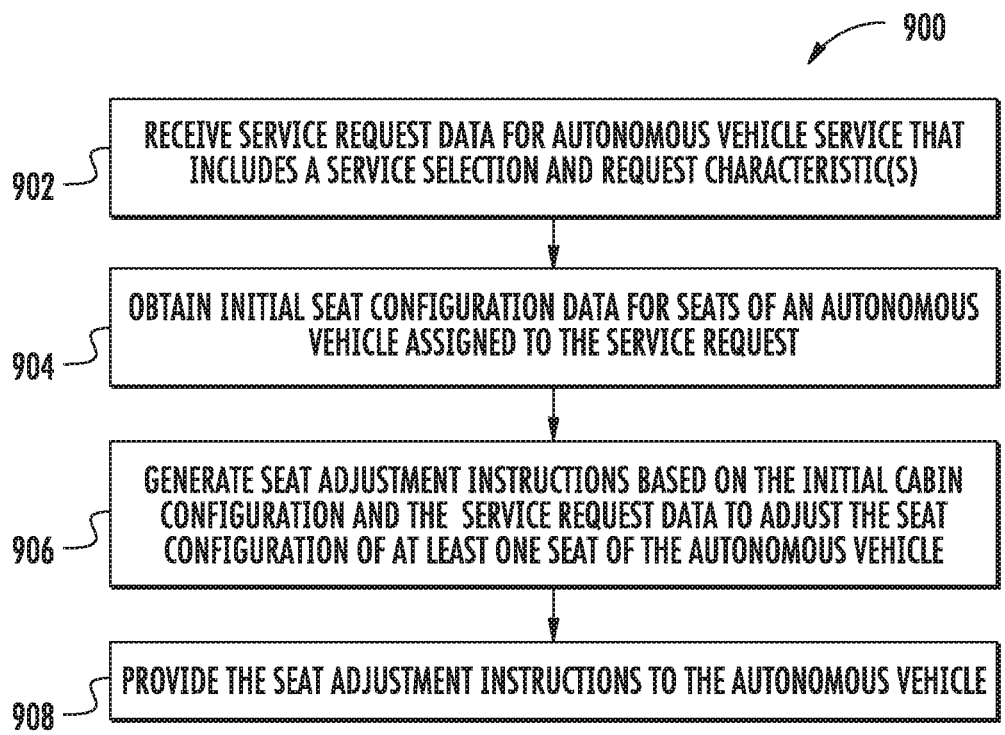
FIG. 9 depicts a flowchart of a method for generating and providing seat adjustment instructions to an autonomous vehicle according to aspects of the present disclosure.

FIG. 9 depicts a flowchart of a method 900 for generating and providing seat adjustment instructions to an autonomous vehicle according to aspects of the present disclosure. One or more portion(s) of the operations of method 900 can be implemented by one or more computing systems that include, for example, one or more portions of an operations computing system (e.g., operations computing system 102, etc.). Each respective portion of the method 900 can be performed by any (or any combination) of the computing device(s) of the respective computing system. Moreover, one or more portion(s) of the method 900 can be implemented as an algorithm on the hardware components of the device(s) described herein, for example, to facilitate generation of seat reconfiguration instructions. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 902, the method 900 can include receiving service request data for an autonomous vehicle service that includes a service selection and request characteristics. More particularly, a computing system (e.g., an autonomous vehicle computing system, an operations computing system, etc.) can obtain a service request from a user for a vehicle service. The service request can include and/or be associated with service request data indicating a service provided by an autonomous vehicle. The autonomous vehicle can be an autonomous vehicle with the capacity to reconfigure its seats based on a number of factors (e.g., the service request data, etc.). The service request data can include a service selection. The service selection can indicate a particular service from a plurality of services offered by an autonomous vehicle and an associated service provider (e.g., food delivery, autonomous human passenger transportation, pooled transportation service, delivery services, courier services, etc.). As an example, the service request data can indicate an autonomous vehicle transportation service at a highest service tier of a number of service tiers (e.g., a more luxurious transportation service, etc.). As another example, the service request data may indicate a pooled transportation service (e.g., a transportation service pooled amongst a number of passengers submitting separate service requests).

It should be noted that the autonomous vehicle providing the service selected by the service selection can be an autonomous vehicle capable of a plurality of seat configurations. More particularly, the autonomous vehicle can include one or more seats that can individually or collectively be reconfigured (e.g., reconfiguration of a seat orientation and/or a seat position). As an example, a seat of the autonomous vehicle can change a location inside the autonomous vehicle (e.g., by sliding longitudinally along a track inside the cabin of the autonomous vehicle, etc.). As another example, a seat of the autonomous vehicle can change an orientation inside the autonomous vehicle (e.g., fully retracting a headrest in the seat, changing an angle of the seat back of the seat, folding the seat back onto the seat base of the seat to form a table, etc.). In such fashion, the seating arrangement of seats in the autonomous vehicle can be dynamically reconfigured to more efficiently provide a number of different services.

The service request data, associated with a user's service request, can include one or more request characteristics. The request characteristic(s) can describe aspect(s) of the requestor(s) and/or the selected service. In some implementations, the request characteristic(s) can describe an expected occupancy. As an example, the request characteristic(s) can indicate if a requestor of the service has indicated additional passengers for an autonomous transportation service (e.g., children, family members, friends, etc.). In some implementations, the expected occupancy can include occupancy predictions associated with the selected service. As an example, the computing system may determine (e.g., using machine-learned model(s), passenger data, etc.) that a service requestor generally travels with more than one person. As another example, the expected occupancy predictions may indicate a certain number of predicted occupants based on the service selection (e.g., a service selection for a certain tier of an autonomous transportation service, an pooled transportation service selection, etc.). The expected occupancy predictions can be generated using various methods by the computing system (e.g., machine-learning techniques, deterministic prediction algorithms, etc.).

In some implementations, the expected occupancy predictions can be based at least in part on previously collected autonomous vehicle sensor data associated with the requestor. As an example, previous service request(s) from the requestor can be associated with sensor data that indicated the presence of two additional passengers in the vehicle (e.g., collected from seat weight sensors, door sensors, etc.). In such fashion, the computing system can use previously collected sensor data to associate a usual number of additional passengers with a certain requestor.

In some implementations, the expected occupancy predictions can include a prediction of specific identity(s) of passenger(s) predicted to accompany the requestor. As an example, a requestor may historically request a certain tier of an autonomous vehicle transportation service when traveling with a spouse. Based on the service tier selection, the computing system can predict that the spouse of the requestor will accompany the spouse in the autonomous vehicle transportation service. Additionally, in some implementations, the passenger preferences for the spouse of the above example can be included in the expected occupancy predictions. For example, passenger preference data for the spouse may indicate that the spouse generally prefers a certain seat configuration for the autonomous vehicle transportation service.

In some implementations, the request characteristic(s) can include passenger preference data. Passenger preference data can indicate a requestor(s) preferred seat configuration for a vehicle. It should be noted that passenger preference data can refer to passengers of the autonomous vehicle. However, some services do not require a passenger (e.g., a food delivery service, etc.) and as such, passenger or requestor may be used interchangeably when discussing services of the autonomous vehicle. A "passenger" of the vehicle, as described, can refer to both the requestor of the service and any additional occupants of the vehicle. The preferred seat configuration can be based on an analysis of previous data associated with the requestor (e.g., user scores, user satisfaction determinations, previously selected user configurations, etc.). As an example, the passenger preference data may include user score(s) and/or user satisfaction data associated with services previously requested by the requestor. For example, if the requestor previously requested an autonomous transportation service at a certain tier, and the requestor left a poor review for the service after completion, the seat configuration of the autonomous vehicle while providing the service can be disincentivized for selection (by the computing system) for subsequent service requests by the requestor. Moreover, a computing system (e.g., its machine-learned models, etc.) can be receive user rating(s), review(s), etc. as a feedback process to learn which seat configurations were positively received by user(s) and which seat configurations were negatively received by user(s). The computing system can re-train/re-learn and adjust a certain seat configuration for a selected service in hopes of decreasing the amount of future negative feedback.

In some implementations, the passenger preference data can include user-entered data corresponding to the seat configuration of the autonomous vehicle. As an example, the user-entered data may specify a certain seat configuration preference for a number of the services of the autonomous vehicle. For example, the user-entered data may indicate that the user prefers a seat configuration that maximizes cabin space when requesting a highest service tier for an autonomous vehicle transportation service. As another example, the user-entered data may include a request to opt-out of certain seat configurations. For example, the user-entered data may include a request that the autonomous vehicle never use a passenger-facing seat configuration (e.g., vehicle seats facing one another, etc.) when requesting a highest service tier for an autonomous vehicle transportation service.

In some implementations, the passenger preference data can include preferences for two or more passengers of the autonomous vehicle transportation service. As an example, two requestors may request an autonomous vehicle pooled rideshare service. The passenger preference data can include specific passenger preference data for each of the two requestors. As another example, a single requestor can request an autonomous vehicle transportation service, and the service request can indicate the identity of two additional passengers. The passenger preference data can include specific passenger preference data for each of the two additional passengers.

In some implementations, the computing system can aggregate the passenger preference data for a number of passengers of the autonomous vehicle. More particularly, the passenger preference data can be aggregated such that the aggregated passenger preference data indicates a seat configuration preference that satisfies the most passengers. As an example, four passengers can be utilizing an autonomous vehicle pooled rideshare service. Passenger preference data for three of the passengers can indicate that the passengers prefer a seat configuration where passengers do not face each other. Passenger preference data for one passenger can indicate the passenger prefers a seat configuration where passengers do face each other. The passenger preference data for all four passengers can be aggregated such that the aggregated passenger preference data indicates that the passengers prefer a seat configuration where passengers do not face each other.

In some implementations, the passenger preference data can indicate accessibility configurations required by a passenger. As an example, passenger preference data for a passenger who uses a wheelchair can indicate that the passenger requires a seat configuration accessible to wheelchair-using occupants (e.g., an open seat configuration to facilitate wheelchair access, an extendable wheelchair ramp, etc.). In such fashion, the passenger preference data can be utilized to quickly and efficiently provide accessibility services to passengers who would previously be forced to wait for significant periods of time before a specially configured vehicle was available for them.

In some implementations, the passenger preference data can indicate passenger historical data. The historical data can describe previous passenger preferences and/or behaviors that indicate a preference. As described previously, the historical data can be utilized by the computing system to predict an expected occupancy. As an example, the historical data can indicate that the passenger generally travels with two additional occupants when requesting an autonomous vehicle transportation service. In some implementations, the historical data can indicate previous behavior that indicates preferred configurations. As an example, the historical data may indicate that a passenger generally brings luggage when requesting an autonomous vehicle transportation service to an airport, and therefore prefers a seat configuration that maximizes luggage capacity in the autonomous vehicle when traveling to an airport. The historical data for the passenger can store and utilize any previous preferences and/or behaviors that relate to the selection of an autonomous vehicle seat configuration.

In some implementations, the historical data can indicate a passenger experience level with the autonomous vehicle transportation service. More particularly, the historical data can indicate a number of times the requestor and any associated passengers have utilized various service(s) of the autonomous vehicle service provider. As an example, the historical passenger data can indicate that a requestor has never previously utilized an autonomous vehicle transportation service. In response, the seat configuration can, in some implementations, be adjusted (e.g., via seat adjustment instructions) to increase the comfort of the requestor. As another example, the historical data can indicate that a passenger associated with the requestor has never previously utilized an autonomous vehicle transportation service. In response, the seat configuration can, in some implementations, be adjusted (e.g., via seat adjustment instructions) to increase the comfort of the passenger.

It should be noted that, in some implementations, the passenger preference data associated with a passenger can be analyzed as it is collected, utilized to generate and/or modify seat configuration preferences, and then discarded. More particularly, the passenger preference data may only contain a passenger's predicted seat configuration preferences, without containing any personalized information (e.g., passenger locations, passenger behavior, etc.). As such, the passenger preference data can be utilized to optimally predict the best seat configuration for a passenger without containing any personalized data associated with the passenger.

Additionally, or alternatively, in some implementations, passengers and requestors of services may opt-out of any passenger preference data collection, and/or can opt-out of the collection of specific passenger preference data. In some implementations, passengers or requestors of the autonomous vehicle may be required to "opt-in" to passenger preference data collection.

In some implementations, the request characteristic(s) can include an associated trip service route. The associated trip service route can include a start location and an end location for the associated trip service route. As an example, a requestor can request an autonomous vehicle transportation service from the requestor's location to a restaurant. The start location of the associated trip service route can be the requestor's location and the end location for the associated trip service route can be the restaurant.

In some implementations, the associated trip service route can include route features for the planned route to be navigated from the start location to the end location. In some implementations, the planned route can be generated by the computing system. Alternatively, in some implementations, the planned route can be generated by an associated computing system that is communicatively coupled to the computing system (e.g., a route planning computing system, operations computing system, etc.). The route features can be one or more features of the planned route. The route features can include a highest speed, a type of steering required for the route, a route environment, a route duration, or any other type of information relevant to the route traveled by the autonomous vehicle from the start location to the end location.

As an example, the route features can indicate that the route environment is generally considered a scenic route (e.g., based on aggregated passenger preference data, weather data, etc.) that is easily viewed from certain windows of the autonomous vehicle (e.g., viewing the ocean from the left side of the autonomous vehicle, etc.). As another example, the route features may indicate that the route requires a number of sharp cornering maneuvers generally unsuitable for certain seat configurations. As yet another example, the route features may indicate that the planned route requires high-speed highway travel that is generally considered unsuitable for certain seat configurations.

In some implementations, the route features can be aggregated over time alongside passenger data to better predict the effect of route features (e.g., using machine-learning techniques, etc.). As an example, the computing system can generally associate passenger data indicating passenger sickness with certain seat configurations and high speed cornering. As another example, the computing system can generally associate passenger data indicating discomfort with certain seat configurations and highway travel. In such fashion, the computing system can predict an optimal seat configuration based on the route features of the planned route.

At 904, the method 900 can include obtaining initial seat configuration data for seats of an autonomous vehicle assigned to the service request. More particularly, the computing system can obtain data describing an initial seat configuration for each of a plurality of seats of an autonomous vehicle assigned to the service request. In some implementations, the assigned autonomous vehicle can be assigned to provide the service by the computing system. Alternatively, in some implementations, an associated computing system can assign the autonomous vehicle to provide the service (e.g., an operations computing system, etc.). In some implementations, the data describing the initial seat configuration can be obtained directly from the autonomous vehicle (e.g., via a network, etc.). Alternatively, in some implementations, the data describing the initial seat configuration can be obtained from a computing system associated with the autonomous vehicle (e.g., a third-party computing system, a routing computing system, etc.). Alternatively, in some implementations, if the computing system is an autonomous vehicle computing system (e.g., a computing system located onboard the autonomous vehicle, etc.) the data describing the initial seat configuration can be obtained from the sensors and/or a computing device of the autonomous vehicle.

The initial seat configuration for each seat of the autonomous vehicle can include a seat position for the seat within the cabin of the autonomous vehicle. The seat position for the seat within the cabin can be a longitudinal and/or lateral position inside the cabin. As an example, if viewing the exterior doors of the vehicle, the seat can be located longitudinally along the side of the vehicle. More particularly, the seat position can correspond to a position on a track (e.g., a seat track located in the floor of the autonomous vehicle, etc.) that spans the interior of the autonomous vehicle. The seat position can be reconfigured by moving the seat along the seat track inside the autonomous vehicle. In such fashion, the seat position of the initial seat configuration can describe a longitudinal position on the track located in the floor of the autonomous vehicle.

It should be noted that, in some implementations, not all seats of the autonomous vehicle are necessarily connected to the track inside the floor of the autonomous vehicle. Instead, the seat position can describe a folded position of a seat in the autonomous vehicle that is not connected to a track inside the autonomous vehicle. More particularly, a first seat of the autonomous vehicle can be configured to fold forward to attach to the back of a second seat of the autonomous vehicle. Further, the first seat can be configured to unfold from the back of the seat to a default seat position. In such fashion, one seat can fold and unfold from the back of another seat inside the autonomous vehicle.

The initial seat configuration for each seat of the autonomous vehicle can include a seat orientation for each of the seats in the autonomous vehicle. The seat orientation can include a backrest, a seat base, and/or a headrest orientation. The seat backrest can be the back-support component of the seat. The seat backrest orientation can be configured to move about an angle where the seat backrest attaches to a seat base of the seat. As an example, the seat backrest can fold to be parallel to the seat base of the seat. As another example, the seat backrest can be positioned to be perpendicular to the seat base of the seat. The seat base, similar to the seat back, can move about an angle of the seat to adjust a sitting angle. Additionally, the seat base can move longitudinally about an axis.

In some implementations, the seat base can be moved concurrently with the seat backrest to switch a facing direction of the seat. As an example, the seat can be facing a first direction (e.g., a passenger sitting in the seat would be looking in the first direction). The seat backrest can move in conjunction with the seat base such that the seat can subsequently face a second direction opposite that of the first direction (e.g., facing away from one another).

The seat orientation can describe an orientation of the headrest of a seat. The orientation of the headrest can correspond to a lateral position of the headrest of the seat. More particularly, the headrest orientation can refer to a degree of retraction of the headrest into the backrest of the seat. As an example, the headrest can be oriented to fully retract inside the backrest of the seat (e.g., to facilitate configuration of the seat into a table configuration, etc.). As another example, the headrest orientation can be configured to fully extend outside the backrest of the seat.

In some implementations, the initial seat configuration for each seat of the autonomous vehicle can include a seat direction for each of the seats in the autonomous vehicle. The seat direction for a seat can describe a direction the seat is facing relative to other aspects of the autonomous vehicle. More particularly, the seat direction can be defined as the direction that a passenger of the seat would face. As an example, a front facing seat direction can describe a seat direction in which a passenger sitting in the seat would face longitudinally towards the front section of the autonomous vehicle. As another example, a rear facing seat direction can describe a seat direction in which a passenger sitting in the seat would face longitudinally towards the rear section of vehicle. As yet another example, a side facing seat direction can describe a seat direction in which a passenger sitting in the seat would face laterally towards a side section of the vehicle (e.g., to facilitate viewing of natural scenery through vehicle windows, etc.). In such fashion, the seat direction of the initial seat configuration can describe any seat direction of a seat relative to aspects of the autonomous vehicle At 906, the method 900 can include generating seat adjustment instructions based on the initial cabin configuration and the service request data. The seat adjustment instructions can adjust the seat configuration of seat(s) of the autonomous vehicle. More particularly, the computing system can generate seat adjustment instructions. The seat adjustment instructions can be based on the initial cabin configuration and the service request data. The seat adjustment instructions can be configured to adjust an initial seat configuration of at least one seat of the plurality of seats inside the cabin of the autonomous vehicle. In some implementations, the seat adjustment instructions can be configured to adjust the initial seat configuration to maximize an amount of cabin space (e.g., based on the service request, etc.). The instructions can do so by adjusting the initial seat configuration so that the seats are positioned on the longitudinal edges of the cabin of the autonomous vehicle. For example, the instructions can be configured to adjust a seat back orientation, a headrest orientation, a seat bottom orientation, and/or a seat position of a seat of the autonomous vehicle.

In some implementations, the seat adjustment instructions can be configured to adjust the seat configurations such that the seats do not face one another (e.g., based on passenger preferences indicating passengers prefer to avoid eye contact, etc.). As an example, the seats can be initially configured to face one another. The seat adjustment instructions can be configured to adjust the seat configuration so that the seat backrest and seat base move in such a way that the seats face away from one another. Additionally, the seat adjustment instructions can move the position of the seats so that the backs of opposing seats are adjacent to each other in the middle of the autonomous vehicle cabin. In such fashion, the seat adjustment instructions can change an initial passenger-facing seat configuration to a more "bench-like" seat configuration where the backs of the seats are positioned are against each other.

Alternatively, in some implementations, the seat adjustment instructions can be configured to adjust the seat configurations such that the seats do face one another (e.g., based on passenger preference data indicating that two passengers know each other, etc.). As an example, the fare data (e.g., the fare data received in the service request) can indicate that two passengers (e.g., picked-up or dropped-off at the same location) are splitting a fare for an autonomous vehicle transportation service. In response, the seat adjustment instructions can be configured to adjust the seat configuration so that the seat backrest and the seat base move in such away that the seats face each other (e.g., to facilitate eye contact, conversation, etc.). In such fashion, the seat adjustment instructions can change an initial same-facing "bench-like" seat configuration to a "passenger-facing" seat configuration to facilitate communication and comfort between friends and family.

In some implementations, the seat adjustment instructions can be configured to adjust the seat configurations such that one or more seats in a row are staggered such that the one or more seats are positioned slightly further in a longitudinal direction than the one or more other seats. As an example, three seats can initially be configured to be positioned in a row, where each seat is positioned in the exact same longitudinal position (e.g., each seat is on an individual track where the longitudinal position of each seat on each track is the same). The seat adjustment instructions can be configured to adjust the longitudinal position of the middle of the three seats so that the middle seat is positioned further longitudinally in the direction the seats are facing than the two side seats (e.g., based on expected occupancy data indicating a certain number of passengers, etc.). As another example, two seats can initially be configured to be positioned in a row, where each seat is positioned in the exact same longitudinal position. The seat adjustment instructions can be configured to adjust the longitudinal position of one of the two seats so that the seat is positioned further longitudinally in the direction the seats are facing than the other seat. In such fashion, one or more seats can be positioned slightly forward in a seat-facing direction than the other seat(s) in the row, therefore reducing the chance that passengers sitting in the seats in the row will rub shoulders.

In some implementations, the seat adjustment instructions can be configured to adjust the seat configurations such that one or more of the seats are folded into a table configuration (e.g., based on passenger preference data indicating that a passenger is likely to work and/or to eat during the service, etc.). As an example, the seats can be initially configured to face one another. The seat adjustment instructions can be configured to adjust the seat configuration so that the seat backrest of one seat folds to a position parallel to the seat base (e.g. both the seat base and the seat backrest parallel to the floor of the autonomous vehicle, etc.). Additionally, the seat adjustment instructions can move the position of the folded seat so that the seat is directly in front of a passenger and a relatively short distance from the passenger. In such fashion, the seat adjustment instructions can change an initial passenger-facing seat configuration "table" configuration such that the passenger can use the backrest of the seat as a table for eating or working during the autonomous transportation service. Such a seat configuration can be associated with a "business" or "work" type of service selection such that a passenger may utilize the table as a working surface.

In some implementations, the seat adjustment instructions be based at least in part on a destination location. The seat adjustment instructions can be configured to adjust the seat configurations to a cargo capacity configuration such that seats of the autonomous vehicle are folded and/or moved to maximize the cargo capacity of the autonomous vehicle (e.g., based on a food delivery service selection, an airport destination, etc.). For example, the destination of the vehicle can be an airport location (e.g., based on the request characteristics, etc.). Based on the airport destination, the seat adjustment instructions can move the seat position and the seat orientation of one or more seats in the cabin to maximize a cargo capacity of the autonomous vehicle (e.g., folding one or more seats, etc.). It should be noted that in some implementations, the cargo capacity configuration can have an occupied mode and a non-occupied mode. The occupied mode can configure the seats to maximize a cargo space in the vehicle while still allowing passengers to occupy the vehicle (e.g., maintaining some seats in an unfolded position, etc.), while the non-occupied mode can configure the seats to maximize the cargo space in the vehicle without regard to the occupancy of the vehicle (e.g., folding all seats in the vehicle, etc.).

As described previously, the seat adjustment instructions can be based at least in part on the service request data. As an example, the seat adjustment instructions can be based on the service selection. For example, the seat configuration can be adjusted to maximize cargo space based on a food delivery service selection. For another example, the seat configuration can be adjusted to maximize the passenger capacity of the vehicle based on an autonomous vehicle rideshare pooling service selection. Further, the seat adjustment instructions can be based on the request characteristic(s). As an example, the seat configuration can be adjusted to maximize passenger capacity based on an expected occupancy prediction. As another example, the seat configuration can be adjusted to maximize the comfort of one passenger based on passenger preference data. As yet another example, the seat configuration can be adjusted to a seat configuration that provides accessibility features based on accessibility data (e.g., the capability to fit a wheelchair, etc.).

In some implementations, generating the seat adjustment instructions can include detecting, by the computing system using one or more sensors in the cabin of the autonomous vehicle, one or more objects inside the cabin of the autonomous vehicle. More particularly, the computing system can utilize sensor(s) in the cabin of the autonomous vehicle (e.g., camera(s), weight sensor(s), etc.) to detect objects inside the autonomous vehicle (e.g., forgotten briefcases, toys, smartphones, etc.). Based on the detected objects, the computing system can generate and/or modify the seat adjustment instructions. As an example, the computing system can determine, based on the initial seat configuration and the service request data, to fold three seats in a row to a folded position. The computing system can detect a briefcase left by a passenger in the middle seat. In response, the computing system can generate seat adjustment instructions that fold the outer two seats in the row into a folded position while keeping the middle seat (e.g., the seat with the briefcase) in an upright position to avoid damaging the briefcase and/or the seat.

Alternatively, in some implementations, the example described above could instead lead the autonomous vehicle to take a separate action. As an example, the autonomous vehicle may forego generating any seat adjustment instructions. Instead, the autonomous vehicle may provide a notification to the passenger associated with the item (e.g., including it should be removed, has been left, etc.). As another example, the autonomous vehicle may return to a maintenance location so that the object can be removed. It should be noted that the autonomous vehicle can take any sort of action in response to detecting the presence of an object in the interior of the cabin of the autonomous vehicle.

In some implementations, the computing system can utilize sensor data to determine the efficiency of various seat configuration(s) (e.g., using machine-learning techniques, etc.). More particularly, the computing system can analyze various performance characteristics (e.g., passenger ingress and/or egress, luggage loading and/or unloading, etc.) based on the sensor data to determine seat configuration efficiency for facilitating passenger utilization of the autonomous vehicle. As an example, sensor data (e.g., weight sensor, image data, motion detector data, etc.) can be analyzed to determine that passenger ingress takes more time than average when utilizing a certain seat configuration. Based on the amount of time, the computing system can determine and/or assign a seat configuration efficiency value to the seat configuration. The computing system can evaluate the seat efficiency value when generating seat adjustment instructions.

Additionally, in some implementations, the computing system can associate seat configuration efficiency with request characteristics data. More particularly, a seat efficiency value can be correlated to certain request characteristics (e.g., a number of passengers, an amount of luggage, a trip duration, a number of stops, etc.) In such fashion, a first seat configuration could be associated with a plurality of seat efficiency values, each seat efficiency value correlated to different circumstances indicated by request characteristic data. As an example, the computing system can assign a first seat efficiency value to a first seat configuration when three passengers are traveling in the vehicle. The computing system can then assign a second seat efficiency value to the first seat configuration when one passenger is traveling in the vehicle. When evaluating seat configuration efficiency to generate seat adjustment instructions, the computing system can utilize the seat efficiency value that corresponds to the current circumstances indicated by the request characteristic(s). In such fashion, the computing system can utilize such information as a feedback learning process to determine the most efficient seat configuration for the circumstances indicated by the request characteristics (e.g., a number of passengers, a certain destination, a trip duration, etc.). For example, machine-learned models utilized to determine/recommend seat configurations can be re-trained on such data to refine future determinations/recommendations.

At 908, the method 900 can include providing the seat adjustment instructions to the autonomous vehicle. More particularly, the computing system can provide the seat adjustment instructions to the autonomous vehicle. In some implementations, the computing system can be separate from the autonomous vehicle and can provide the seat adjustment instructions to the vehicle (e.g., via networks, associated first and/or third-party computing systems, etc.). Alternatively, in some implementations, the computing system can be included in or otherwise be an autonomous vehicle computing system of the autonomous vehicle (e.g., physically located onboard the autonomous vehicle, etc.), and can therefore directly adjust the seats of the autonomous vehicle based on the seat adjustment instructions.

It should be noted that, in some implementations, the autonomous vehicle can be configured to adjust the seats of the autonomous vehicle based on the seat adjustment instructions before passenger(s) enter the vehicle. More particularly, the autonomous vehicle can begin and complete seat reconfiguration (e.g., based on the adjustment instructions) before allowing occupants to enter the vehicle. In such fashion, the autonomous vehicle can prevent any accidental injury to passengers accessing the autonomous vehicle In some implementations, the computing system can provide the seat adjustment instructions to a plurality of autonomous vehicles. More particularly, based on the receipt of the request data, the computing system can determine that a plurality of vehicles can be reconfigured with the seat reconfiguration instructions. As an example, the computing system (e.g., an operations computing system of an autonomous vehicle service, etc.) can determine, based on a number of collected service requests, that a number of autonomous vehicles should receive the same seat adjustment instructions. For example, the computing system can determine that an entire fleet of autonomous vehicles (e.g., a fleet of autonomous vehicles of the autonomous vehicle service provider, etc.) should all be reconfigured in the same manner based at least in part on data included in the service request. As another example, the computing system can determine that a number of autonomous vehicles located in a certain geographic area (e.g., a high-density urban area, a low-density rural area, etc.) should each reconfigure seating configurations using the same seat adjustment instructions. For example, the computing system can determine from a number of service requests that the vast majority of service requests in a high-density urban area prefer a seat configuration that maximizes a number of passengers of the autonomous vehicle (e.g., to lower an associated ride cost, etc.). In response, the computing system can provide seat adjustment instructions to every or most autonomous vehicles in the high-density urban area to reconfigure the autonomous vehicles to a seating configuration that maximizes a number of passengers of the autonomous vehicle. In such fashion, the computing system can determine an optimal default configuration for an entire fleet of autonomous vehicles and/or a subset of a fleet of autonomous vehicles, and can reconfigure a desired number of vehicles concurrently (e.g., based on market demand, collated service request data, etc.).

Figure 10:
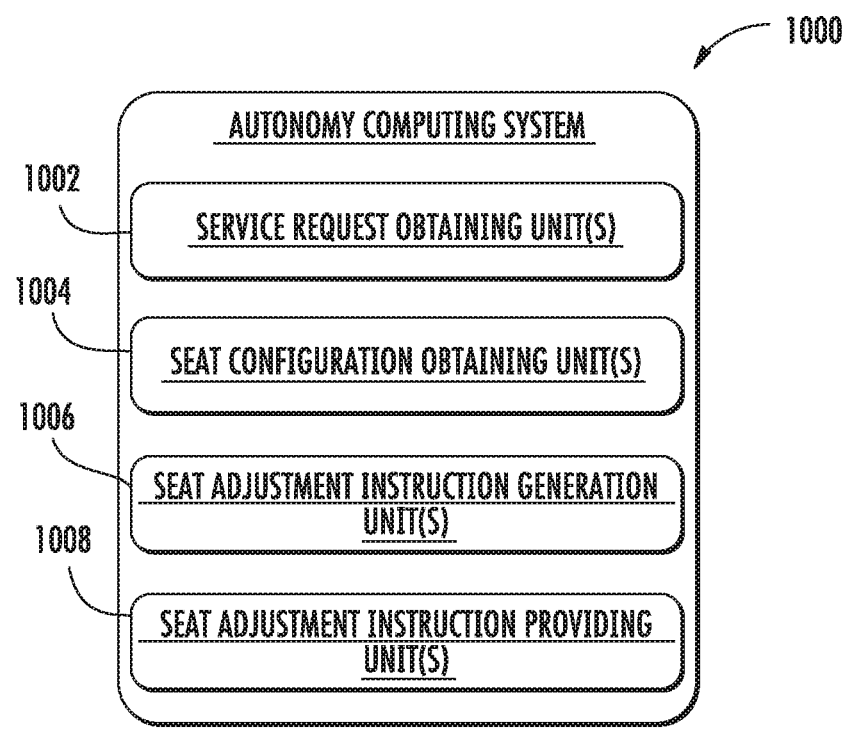
FIG. 10 depicts a block diagram of an example computing system according to example embodiments of the present disclosure.

FIG. 10 depicts a block diagram of an example computing system 1000 according to example embodiments of the present disclosure. Various means of the example autonomy computing system 1000 can be configured to perform the methods and processes described herein. For example, an autonomy computing system 1000 can include service request obtaining unit(s) 1002, seat configuration obtaining unit(s) 1004, seat adjustment instruction generation unit(s) 1006, seat adjustment instruction providing unit(s) 1008 and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means (e.g., service request obtaining unit(s) 1002) can be programmed to perform one or more algorithm(s) for carrying out the operations and functions described herein. For instance, the means can be configured to obtain data (e.g., service request data) from service requestor that indicates a service selection and one or more request characteristics for the service request. A service request obtaining unit 1002 is an example of means obtaining such data from an autonomous vehicle at an operations computing system as described herein.

The means (e.g., seat configuration obtaining unit(s) 1004) can be configured to obtain an initial seat configuration for each seat in an autonomous vehicle. For example, the means can be configured to obtain initial seat configuration data that describes a seat position and a seat orientation for each seat in an autonomous vehicle assigned to a service request. A seat configuration obtaining unit(s) 1004 is one example of a means for obtaining an initial seat configuration for one or more seats of an autonomous vehicle as described herein.

The means (e.g., seat adjustment instruction generation unit(s) 1006) can be configured to generate seat adjustment instructions. For example, the means can be configured to generate, based on the initial seat configuration and the service request data, generate seat adjustment instructions configured to adjust the seat position and/or the seat orientation of at least one seat. A seat adjustment instruction generation unit(s) 1006 is one example of a means for generating seat adjustment instructions configured to reconfigure one or more seats of an autonomous vehicle as described herein.

The means (e.g., seat adjustment instruction providing unit(s) 1008) can be configured to provide seat adjustment instructions. For example, the means can be configured to provide the generated seat adjustment instructions to an autonomous vehicle (e.g., via a network, one or associated computing systems, etc.). A seat adjustment instruction providing unit(s) 1008 is one example of a means for providing the generated seat adjustment instructions to an autonomous vehicle as described herein.

Figure 11:
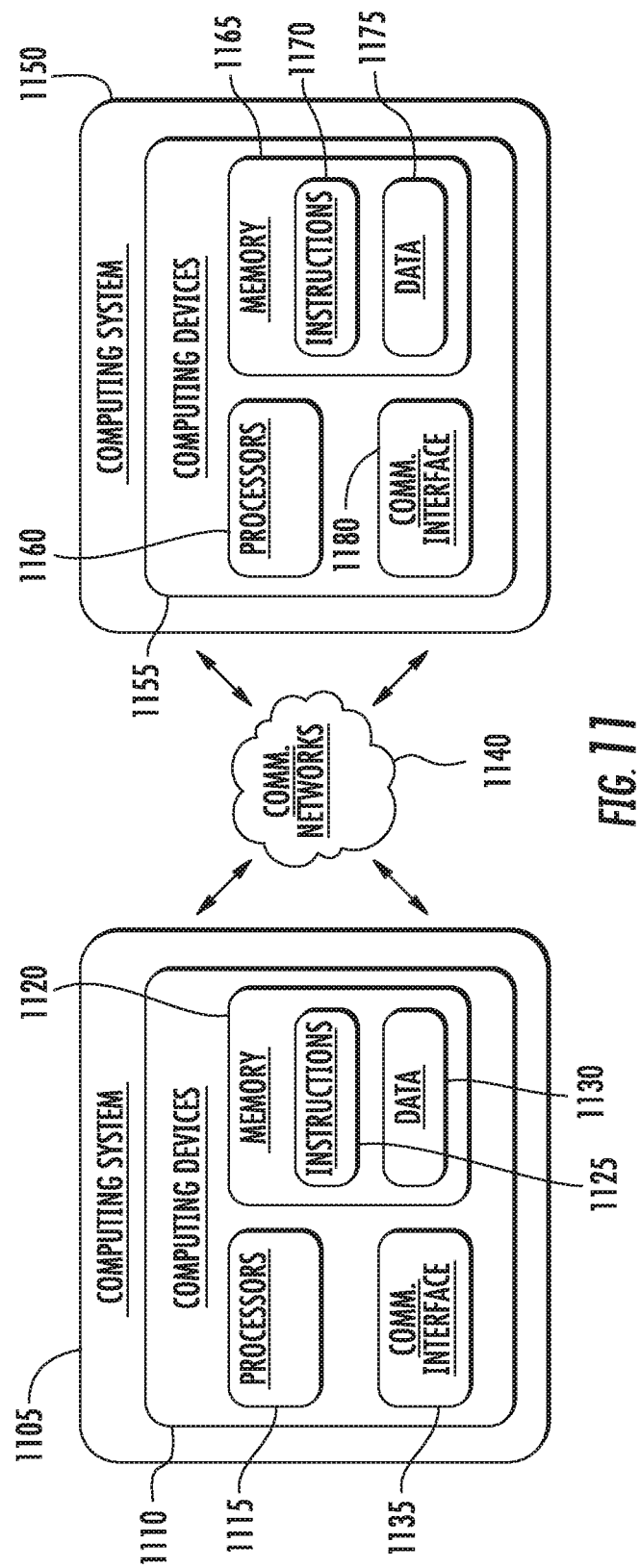
FIG. 11 depicts example system components of an example system according to example embodiments of the present disclosure.

FIG. 11 depicts example system components of an example system 1100 according to example embodiments of the present disclosure. The example system 1100 can include the computing system 1105 (e.g., a vehicle computing system 112, computing system 705, etc.) and the computing system(s) 1150 (e.g., operations computing system 104, etc.), etc. that are communicatively coupled over one or more network(s) 1145.

The computing system 1105 can include one or more computing device(s) 1110. The computing device(s) 1110 of the computing system 1105 can include processor(s) 1115 and a memory 1120. The one or more processors 1115 can be any suitable processing device (e.g., a processor core, a microprocessor, an ASIC, a FPGA, a controller, a microcontroller, etc.) and can be one processor or a plurality of processors that are operatively connected. The memory 1120 can include one or more non-transitory computer-readable storage media, such as RAM, ROM, EEPROM, EPROM, one or more memory devices, flash memory devices, etc., and combinations thereof.

The memory 1120 can store information that can be accessed by the one or more processors 1115. For instance, the memory 1120 (e.g., one or more non-transitory computer-readable storage mediums, memory devices) can include computer-readable instructions 1125 that can be executed by the one or more processors 1115. The instructions 1125 can be software written in any suitable programming language or can be implemented in hardware. Additionally, or alternatively, the instructions 1125 can be executed in logically and/or virtually separate threads on processor(s) 1115.

For example, the memory 1120 can store instructions 1125 that when executed by the one or more processors 1115 cause the one or more processors 1115 to perform operations such as any of the operations and functions for which the computing systems (e.g., computing system 705, vehicle computing system 112) are configured, as described herein.

The memory 1120 can store data 1130 that can be obtained, received, accessed, written, manipulated, created, and/or stored. The data 1130 can include, for instance, vehicle data, sensor data, seat configuration data, passenger preference data, historical passenger data, service assignment data, reconfiguration instruction data, and/or other data/information described herein. In some implementations, the computing device(s) 1110 can obtain from and/or store data in one or more memory device(s) that are remote from the computing system 1105 such as one or more memory devices of the computing system 1150.

The computing device(s) 1110 can also include a communication interface 1135 used to communicate with one or more other system(s) (e.g., computing system 1150). The communication interface 1135 can include any circuits, components, software, etc. for communicating via one or more networks (e.g., 1140). In some implementations, the communication interface 1135 can include for example, one or more of a communications controller, receiver, transceiver, transmitter, port, conductors, software and/or hardware for communicating data/information.

The computing system 1150 can include one or more computing devices 1155. The one or more computing devices 1155 can include one or more processors 1160 and a memory 1165. The one or more processors 1160 can be any suitable processing device (e.g., a processor core, a microprocessor, an ASIC, a FPGA, a controller, a microcontroller, etc.) and can be one processor or a plurality of processors that are operatively connected. The memory 1165 can include one or more non-transitory computer-readable storage media, such as RAM, ROM, EEPROM, EPROM, one or more memory devices, flash memory devices, etc., and combinations thereof.

The memory 1165 can store information that can be accessed by the one or more processors 1160. For instance, the memory 1165 (e.g., one or more non-transitory computer-readable storage mediums, memory devices) can store data 1175 that can be obtained, received, accessed, written, manipulated, created, and/or stored. The data 1175 can include, for instance, vehicle data, sensor data, seat configuration data, passenger preference data, historical passenger data, service assignment data, reconfiguration instruction data, and/or other data/information described herein. In some implementations, the computing system 1150 can obtain data from one or more memory device(s) that are remote from the computing system 1150.

The memory 1165 can also store computer-readable instructions 1170 that can be executed by the one or more processors 1160. The instructions 1170 can be software written in any suitable programming language or can be implemented in hardware. Additionally, or alternatively, the instructions 1170 can be executed in logically and/or virtually separate threads on processor(s) 1160. For example, the memory 1165 can store instructions 1170 that when executed by the one or more processors 1160 cause the one or more processors 1160 to perform any of the operations and/or functions described herein, including, for example, any of the operations and functions of the devices described herein, and/or other operations and functions.

The computing device(s) 1155 can also include a communication interface 1180 used to communicate with one or more other system(s). The communication interface 1180 can include any circuits, components, software, etc. for communicating via one or more networks (e.g., 1140). In some implementations, the communication interface 1180 can include for example, one or more of a communications controller, receiver, transceiver, transmitter, port, conductors, software and/or hardware for communicating data/information.

The network(s) 1140 can be any type of network or combination of networks that allows for communication between devices. In some embodiments, the network(s) 1140 can include one or more of a local area network, wide area network, the Internet, secure network, cellular network, mesh network, peer-to-peer communication link and/or some combination thereof and can include any number of wired or wireless links. Communication over the network(s) 1140 can be accomplished, for instance, via a network interface using any type of protocol, protection scheme, encoding, format, packaging, etc.

FIG. 11 illustrates one example system 1100 that can be used to implement the present disclosure. Other computing systems can be used as well. Computing tasks discussed herein as being performed at a cloud services system can instead be performed remote from the cloud services system (e.g., via aerial computing devices, robotic computing devices, facility computing devices, etc.), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computing system, comprising:
   one or more processors; and
   one or more tangible, non-transitory, computer readable media that store instructions for execution by the one or more processors to cause the computing system to perform operations, the operations comprising:
   obtaining service request data associated with a service request, comprising a service selection from a plurality of services and one or more request characteristics, wherein the service selection is indicative of a type of service of a plurality of different types of services available for the service selection;
   obtaining data describing an initial seat configuration for a plurality of seats of an autonomous vehicle assigned to the service request, the initial seat configuration comprising a seat position and a seat orientation for at least one of the plurality of seats within a cabin of the autonomous vehicle, the seat orientation comprising an orientation of at least one of a backrest, a seat base, or a headrest of the at least one of the plurality of seats;
   determining, based on the service request, a destination location, wherein the destination location is indicative of increased cargo capacity;
   generating, based on the destination location, initial seat configuration, and the type of service indicated in the service request data, seat adjustment instructions configured to adjust the initial seat configuration of the at least one of the plurality of seats of the autonomous vehicle; and
   providing the seat adjustment instructions to the autonomous vehicle assigned to the service request:
   wherein the autonomous vehicle is configured to adjust a vehicle interior comprising the plurality of seats based at least in part on the destination location and the seat adjustment instructions prior to a passenger entering the vehicle interior for the service request,
   wherein the seat adjustment instructions increase the cargo capacity of the autonomous vehicle.

2. The computing system of claim 1, wherein the one or more request characteristics comprise at least one of:
   an expected occupancy;
   passenger preference data for one or more users of the service, the passenger preference data comprising a preferred seat configuration for the autonomous vehicle;
   an associated service route, the service route comprising a start location, an end location, and a route between the start location and the end location; or
   a trip duration.

3. The computing system of claim 1, wherein the service selection comprises a selection of at least one service from the plurality of services, the plurality of services comprising at least one of type of service comprising:
   an autonomous vehicle transportation service, the autonomous vehicle transportation service corresponding to a transportation service tier of a plurality of transportation service tiers;
   an autonomous delivery service; or
   a pooled transportation service, the pooled transportation service comprising transportation of at least two passengers for the autonomous vehicle, the at least two passengers being associated with different service requests.

4. The computing system of claim 3, wherein the plurality of transportation service tiers comprise:
   a first transportation service tier associated with a first seat configuration, the first seat configuration configured to maximize an amount of space for passengers in the cabin of the autonomous vehicle, and
   a second transportation service tier associated with a second seat configuration, the second seat configuration configured to maximize a passenger capacity of the cabin of the autonomous vehicle; and
   wherein the autonomous delivery service is associated with a third seat configuration, the third seat configuration configured to maximize a cargo capacity of the cabin of the autonomous vehicle.

5. The computing system of claim 3, wherein:
   the service selection comprises the pooled transportation service;
   a passenger preference data indicates at least one passenger of the autonomous vehicle prefers a non-passenger facing seat configuration;
   the initial seat configuration comprises a passenger facing seat configuration, wherein two seats of the plurality of seats of the autonomous vehicle face each other within the cabin of the autonomous vehicle; and the seat adjustment instructions are configured to adjust the seat position and the seat orientation of the two seats so that the two seats face away from one another.

6. The computing system of claim 1, wherein:

in the initial seat configuration, a first seat of the autonomous vehicle faces a first longitudinal end of the cabin of the autonomous vehicle; and the seat adjustment instructions are configured to adjust the orientation of the seat base and the backrest of the first seat so that the first seat faces a second longitudinal end opposite to the first longitudinal end of the cabin of the autonomous vehicle.

7. The computing system of claim 1, wherein:

in the initial seat configuration, a first seat of the autonomous vehicle faces a first longitudinal end of the cabin of the autonomous vehicle; and the seat adjustment instructions are configured to adjust the seat orientation so that a seat back of the first seat lies parallel to the seat base of the first seat and the headrest of the seat retracts into the backrest of the seat.

8. The computing system of claim 1, wherein:

a destination location associated with the service request is an airport; and the seat adjustment instructions are configured to adjust the seat position and the seat orientation of the at least one of the plurality of seats to maximize a luggage capacity of the autonomous vehicle.

9. The computing system of claim 1, wherein the computing system comprises an autonomous vehicle computing system located onboard the autonomous vehicle assigned to the service request.

10. The computing system of claim 9, wherein the operations further comprise adjusting, based on the seat adjustment instructions, the initial seat configuration of the at least one of the plurality of seats of the autonomous vehicle.

11. The computing system of claim 1, wherein the plurality of services comprises a delivery service.

12. The computing system of claim 11, wherein the seat adjustment instructions are configured to maximize a cargo capacity of the cabin of the autonomous vehicle for the delivery service.

13. A computer-implemented method comprising:

obtaining service request data associated with a service request, comprising a service selection from a plurality of services and one or more request characteristics, wherein the service selection is indicative of a type of service of a plurality of different types of services available for the service selection;

obtaining data describing an initial seat configuration for a plurality of seats of an autonomous vehicle assigned to the service request, the initial seat configuration comprising a seat position and a seat orientation for at least one of the plurality of seats within a cabin of the autonomous vehicle, the seat orientation comprising an orientation of at least one of a backrest, a seat base, or a headrest of the at least one of the plurality of seats;

determining, based on the service request, a destination location, wherein the destination location is indicative of increased cargo capacity;

generating, based on the destination location, initial cabin configuration and the type of service indicated in the service request data, seat adjustment instructions configured to adjust the initial seat configuration of the at least one of the plurality of seats of the autonomous vehicle; and providing the seat adjustment instructions to the autonomous vehicle assigned to the service request.

14. The computer-implemented method of claim 13, wherein the one or more request characteristics comprise at least one of:

an expected occupancy;

passenger preference data for one or more users of the service, the passenger preference data comprising a preferred seat configuration for the autonomous vehicle;

an associated service route, the service route comprising a start location, an end location, and a route between the start location and the end location; or a trip duration.

15. The computer-implemented method of claim 13, wherein the service selection comprises a selection of at least one service from the plurality of services, the plurality of services comprising at least one of type of service comprising:

an autonomous vehicle transportation service, the autonomous vehicle transportation service corresponding to a transportation service tier of a plurality of transportation service tiers;

an autonomous delivery service; or a pooled transportation service, the pooled transportation service comprising transportation of at least two passengers for the autonomous vehicle, the at least two passengers being associated with different service requests.

16. The computer-implemented method of claim 15, wherein the plurality of transportation service tiers comprise:

a first transportation service tier associated with a first seat configuration, the first seat configuration configured to maximize an amount of space for passengers in the cabin of the autonomous vehicle, and a second transportation service tier associated with a second seat configuration, the second seat configuration configured to maximize a passenger capacity of the cabin of the autonomous vehicle; and wherein the autonomous delivery service is associated with a third seat configuration, the third seat configuration configured to maximize a cargo capacity of the cabin of the autonomous vehicle.

17. The computer-implemented method of claim 13, wherein the plurality of services comprises a delivery service for cargo.

18. The computer-implemented method of claim 13, wherein the seat adjustment instructions are configured to maximize a cargo capacity of the cabin of the autonomous vehicle for a delivery service.

19. The computer-implemented method of claim 13, further comprising adjusting, based on the seat adjustment instructions, the initial seat configuration of at least one of the plurality of seats of the autonomous vehicle.

20. One or more tangible, non-transitory computer readable media storing computer-readable instructions for execution by one or more processors to cause the one or more processors to perform operations, the operations comprising:

obtaining service request data associated with a service request, comprising a service selection from a plurality of services and one or more request characteristics, wherein the service selection is indicative of a type of service of a plurality of different types of services available for the service selection;

obtaining data describing an initial seat configuration for a plurality of seats of an autonomous vehicle assigned to the service request, the initial seat configuration comprising a seat position and a seat orientation for at least one of the plurality of seats within a cabin of the autonomous vehicle, the seat orientation comprising an orientation of at least one of a backrest, a seat base, or a headrest of the at least one of the plurality of seats;

determining, based on the service request, a destination location, wherein the destination location is indicative of increased cargo capacity;

generating, based on the destination location, initial cabin configuration and the type of service indicated in the service request data, seat adjustment instructions configured to adjust the initial seat configuration of the at least one of the plurality of seats of the autonomous vehicle; and providing the seat adjustment instructions to the autonomous vehicle assigned to the service request.

\* \* \* \* \*